US012579784B2

(12) United States Patent
Guo et al.

(10) Patent No.: US 12,579,784 B2
(45) Date of Patent: Mar. 17, 2026

(54) MODEL STRUCTURE, METHOD FOR TRAINING MODEL, IMAGE ENHANCEMENT METHOD, AND DEVICE

(71) Applicant: HUAWEI TECHNOLOGIES CO., LTD., Shenzhen (CN)

(72) Inventors: Tianyu Guo, Shenzhen (CN); Hanting Chen, Shenzhen (CN); Yunhe Wang, Beijing (CN); Chunjing Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 477 days.

(21) Appl. No.: 18/203,337

(22) Filed: May 30, 2023

(65) Prior Publication Data

US 2023/0306719 A1 Sep. 28, 2023

Related U.S. Application Data

(63) Continuation of application No. PCT/CN2021/131704, filed on Nov. 19, 2021.

(30) Foreign Application Priority Data

Dec. 1, 2020 (CN) .......................... 202011382775.1

(51) Int. Cl.
  *G06V 10/771* (2022.01)
  *G06T 5/50* (2006.01)
  (Continued)

(52) U.S. Cl.
  CPC .............. *G06V 10/771* (2022.01); *G06T 5/50* (2013.01); *G06T 7/11* (2017.01); *G06V 10/44* (2022.01);
  (Continued)

(58) Field of Classification Search
  CPC ........ G06V 10/771; G06V 10/44; G06T 7/11; G06T 5/50; G06T 2207/20081; G06T 2207/20084; G06T 2207/20221
  See application file for complete search history.

(56) References Cited

U.S. PATENT DOCUMENTS 10,922,833 B2 * 2/2021 Croxford .................. G06T 1/60
11,062,453 B2 * 7/2021 Shi ........................ G06N 3/0464
(Continued)

FOREIGN PATENT DOCUMENTS

CN 112529150 A 3/2021

OTHER PUBLICATIONS

Bichen Wu et al:"Visual Transformers: Token-based Image Representation and Processing for Computer Vision." arXiv:2006. 03677v4 [cs.CV] Nov. 20, 2020. total 12 pages.
(Continued)

*Primary Examiner* — Gregory M Desire
(74) *Attorney, Agent, or Firm* — WOMBLE BOND DICKINSON (US) LLP

(57) ABSTRACT

Embodiments of this application disclose a model structure, a method for training a model, an image enhancement method, and a device, and may be applied to the computer vision field in the artificial intelligence field. The model structure includes: a selection module, a plurality of first neural network layers, a segmentation module, a transformer module, a recombination module, and a plurality of second neural network layers. The model overcomes a limitation that the transformer module can only be used to process a natural language task, and may be applied to a low-level vision task. The model includes the plurality of first/second neural network layers, and different first/second neural network layers correspond to different image enhancement
(Continued)

tasks. Therefore, after being trained, the model can be used
to process different image enhancement tasks.

19 Claims, 17 Drawing Sheets

(51) Int. Cl.
 *G06T 7/11* (2017.01)
 *G06V 10/44* (2022.01)
(52) U.S. Cl.
 CPC ............... *G06T 2207/20081* (2013.01); *G06T
 2207/20084* (2013.01); *G06T 2207/20221*
 (2013.01)

(56) References Cited

U.S. PATENT DOCUMENTS

| 11,069,030 B2 * | 7/2021 | Shen | ........................ | G06N 3/045 |
| 11,430,123 B2 * | 8/2022 | Kohl | .................... | A61B 5/0033 |
| 11,443,277 B2 * | 9/2022 | Vanapalli | ............... | G06N 3/044 |
| 11,769,321 B2 * | 9/2023 | Kozuka | .................. | G06N 3/045 |
| | | | | 706/25 |

OTHER PUBLICATIONS

Alexey Dosovitskiy et al:"AN Image is Worth 16X16 Words:
Transformers for Image Recognition at Scale." arXiv:2010.11929v1
[cs.CV] Oct. 22, 2020. total 21 pages.

* cited by examiner

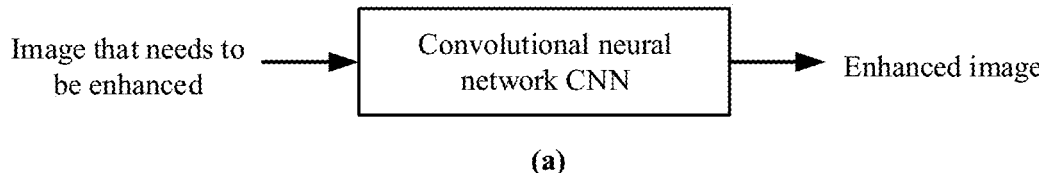
(a)
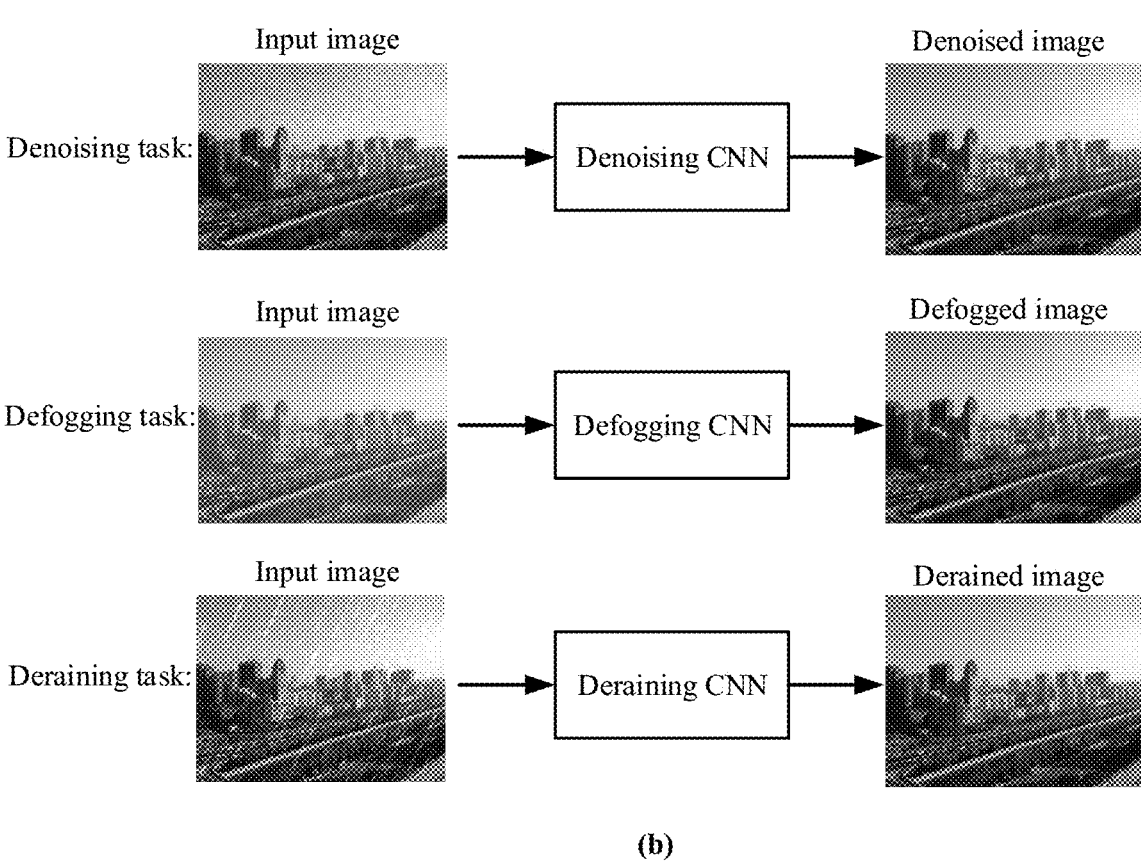
(b)
FIG. 1

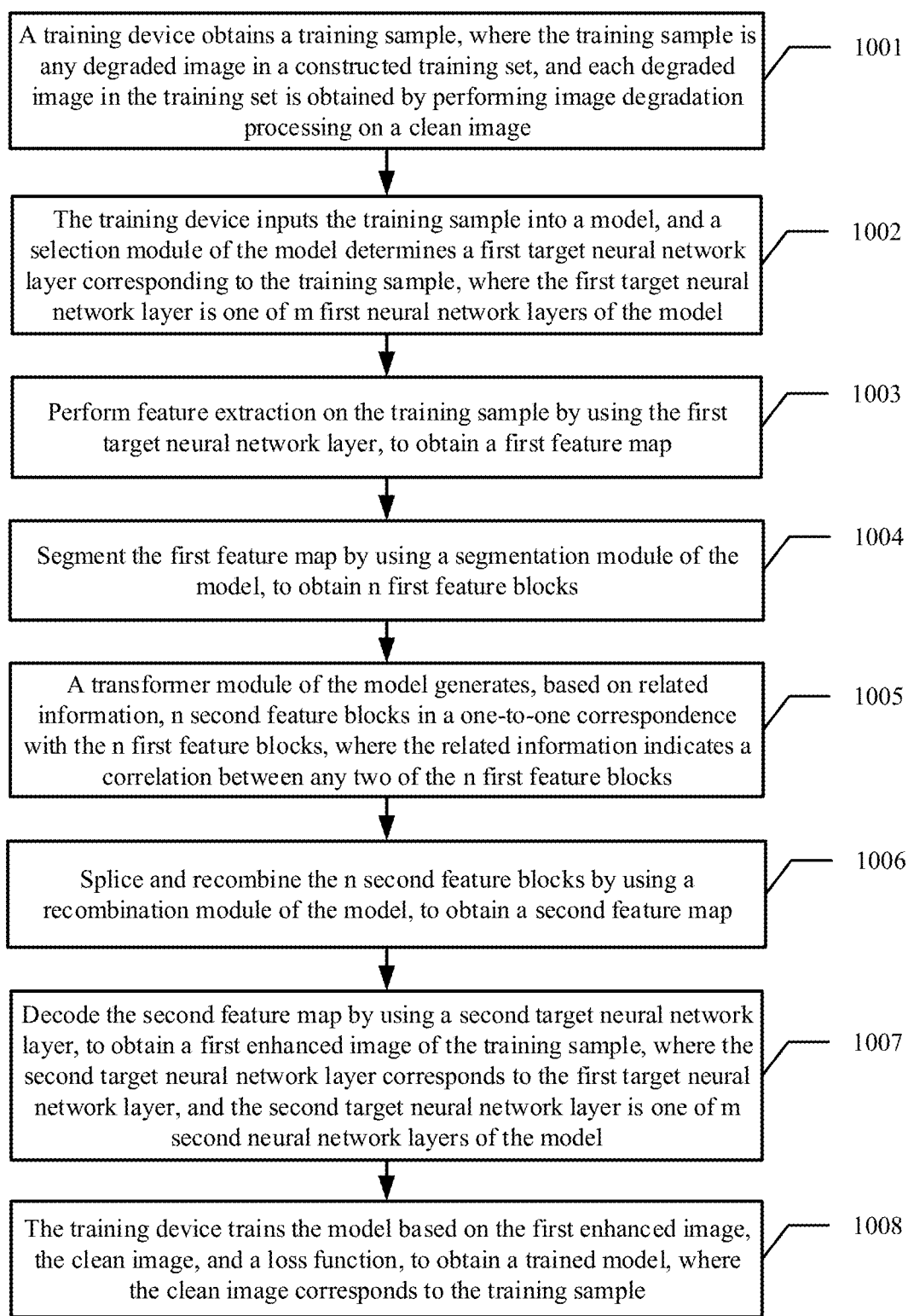

A training device obtains a training sample, where the training sample is any degraded image in a constructed training set, and each degraded image in the training set is obtained by performing image degradation processing on a clean image — 1001

The training device inputs the training sample into a model, and a selection module of the model determines a first target neural network layer corresponding to the training sample, where the first target neural network layer is one of m first neural network layers of the model — 1002

Perform feature extraction on the training sample by using the first target neural network layer, to obtain a first feature map — 1003

Segment the first feature map by using a segmentation module of the model, to obtain n first feature blocks — 1004

A transformer module of the model generates, based on related information, n second feature blocks in a one-to-one correspondence with the n first feature blocks, where the related information indicates a correlation between any two of the n first feature blocks — 1005

Splice and recombine the n second feature blocks by using a recombination module of the model, to obtain a second feature map — 1006

Decode the second feature map by using a second target neural network layer, to obtain a first enhanced image of the training sample, where the second target neural network layer corresponds to the first target neural network layer, and the second target neural network layer is one of m second neural network layers of the model — 1007

The training device trains the model based on the first enhanced image, the clean image, and a loss function, to obtain a trained model, where the clean image corresponds to the training sample — 1008

FIG. 10

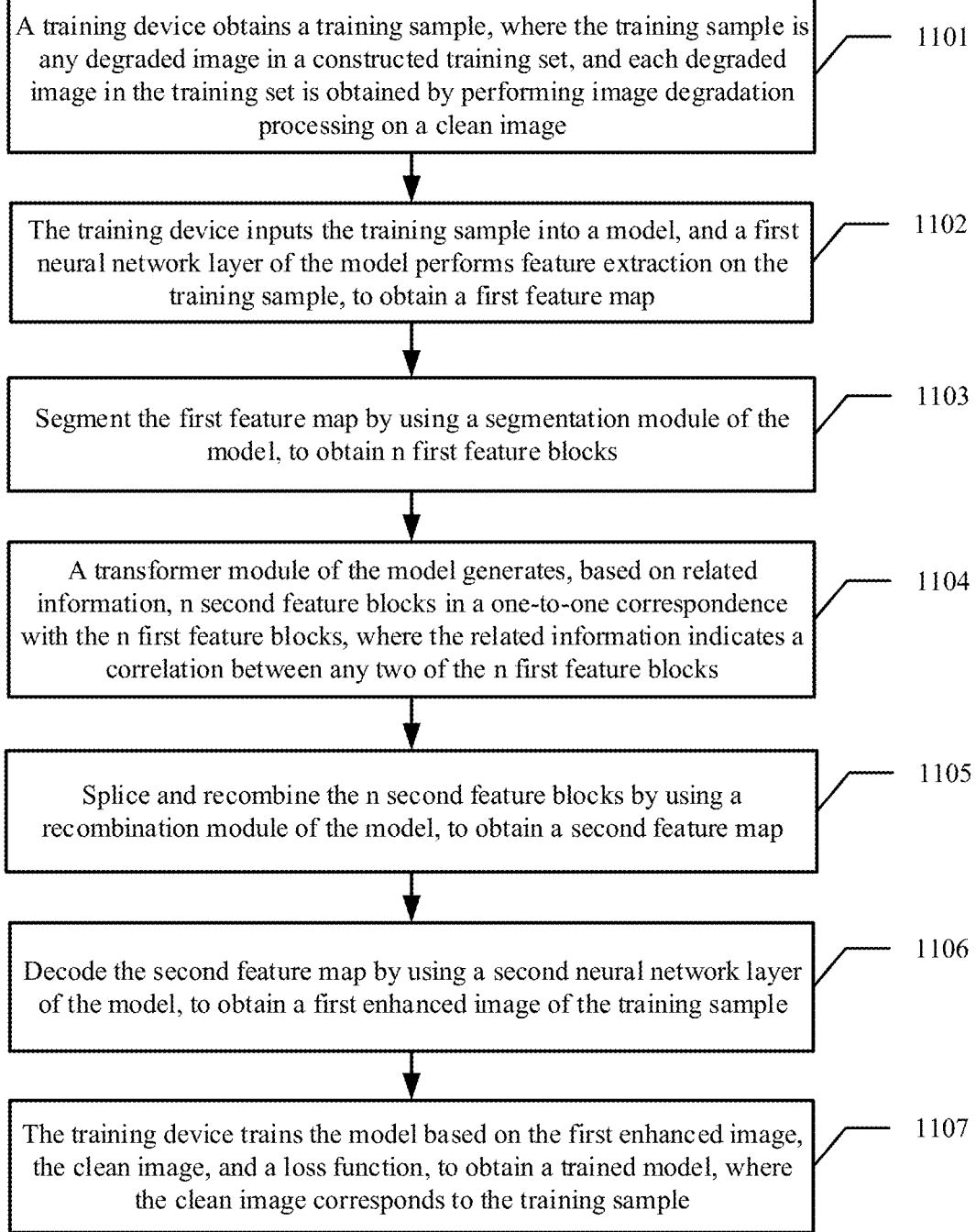

A training device obtains a training sample, where the training sample is any degraded image in a constructed training set, and each degraded image in the training set is obtained by performing image degradation processing on a clean image — 1101

The training device inputs the training sample into a model, and a first neural network layer of the model performs feature extraction on the training sample, to obtain a first feature map — 1102

Segment the first feature map by using a segmentation module of the model, to obtain n first feature blocks — 1103

A transformer module of the model generates, based on related information, n second feature blocks in a one-to-one correspondence with the n first feature blocks, where the related information indicates a correlation between any two of the n first feature blocks — 1104

Splice and recombine the n second feature blocks by using a recombination module of the model, to obtain a second feature map — 1105

Decode the second feature map by using a second neural network layer of the model, to obtain a first enhanced image of the training sample — 1106

The training device trains the model based on the first enhanced image, the clean image, and a loss function, to obtain a trained model, where the clean image corresponds to the training sample — 1107

FIG. 11

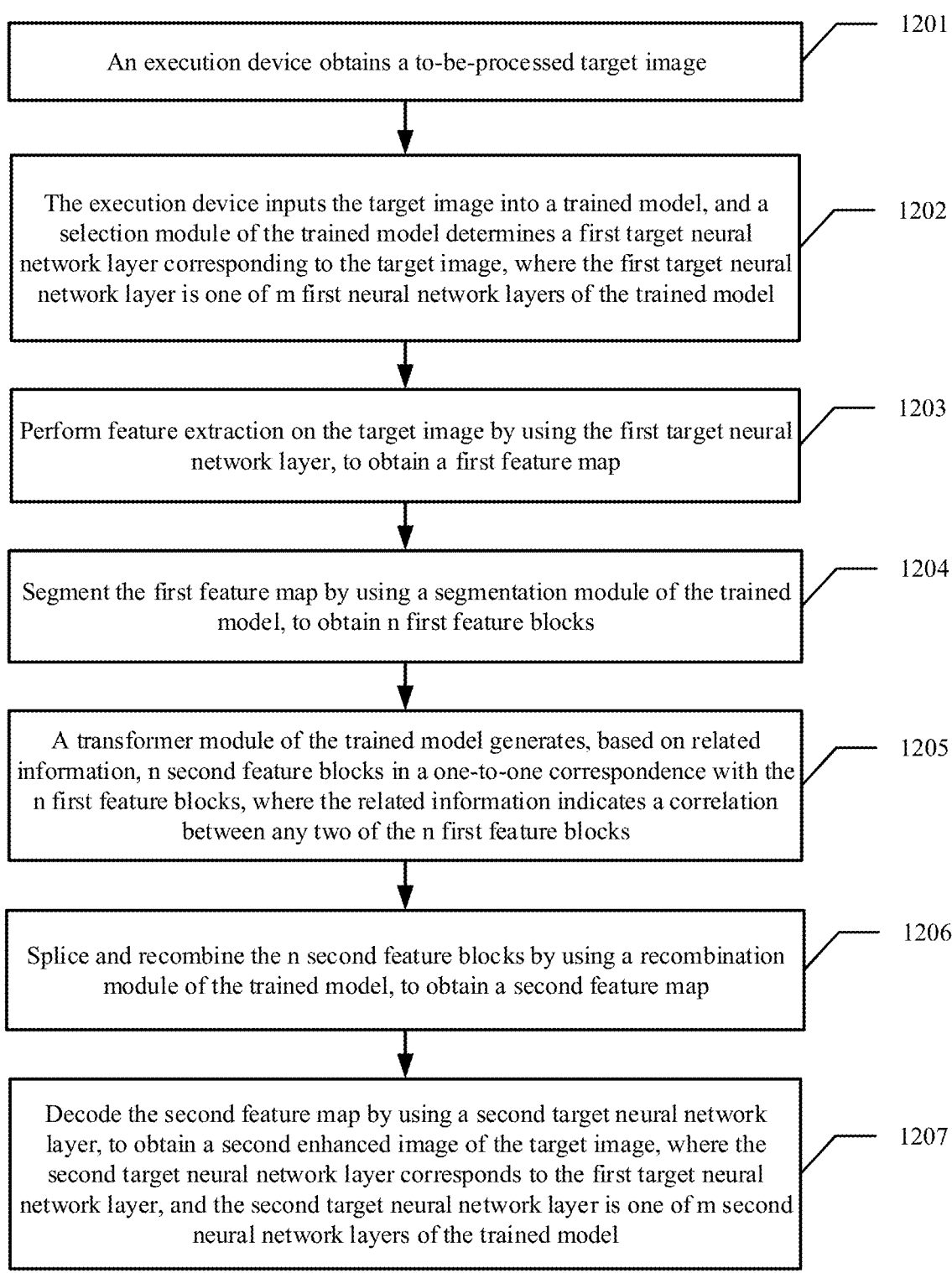

An execution device obtains a to-be-processed target image — 1201

The execution device inputs the target image into a trained model, and a selection module of the trained model determines a first target neural network layer corresponding to the target image, where the first target neural network layer is one of m first neural network layers of the trained model — 1202

Perform feature extraction on the target image by using the first target neural network layer, to obtain a first feature map — 1203

Segment the first feature map by using a segmentation module of the trained model, to obtain n first feature blocks — 1204

A transformer module of the trained model generates, based on related information, n second feature blocks in a one-to-one correspondence with the n first feature blocks, where the related information indicates a correlation between any two of the n first feature blocks — 1205

Splice and recombine the n second feature blocks by using a recombination module of the trained model, to obtain a second feature map — 1206

Decode the second feature map by using a second target neural network layer, to obtain a second enhanced image of the target image, where the second target neural network layer corresponds to the first target neural network layer, and the second target neural network layer is one of m second neural network layers of the trained model — 1207

FIG. 12

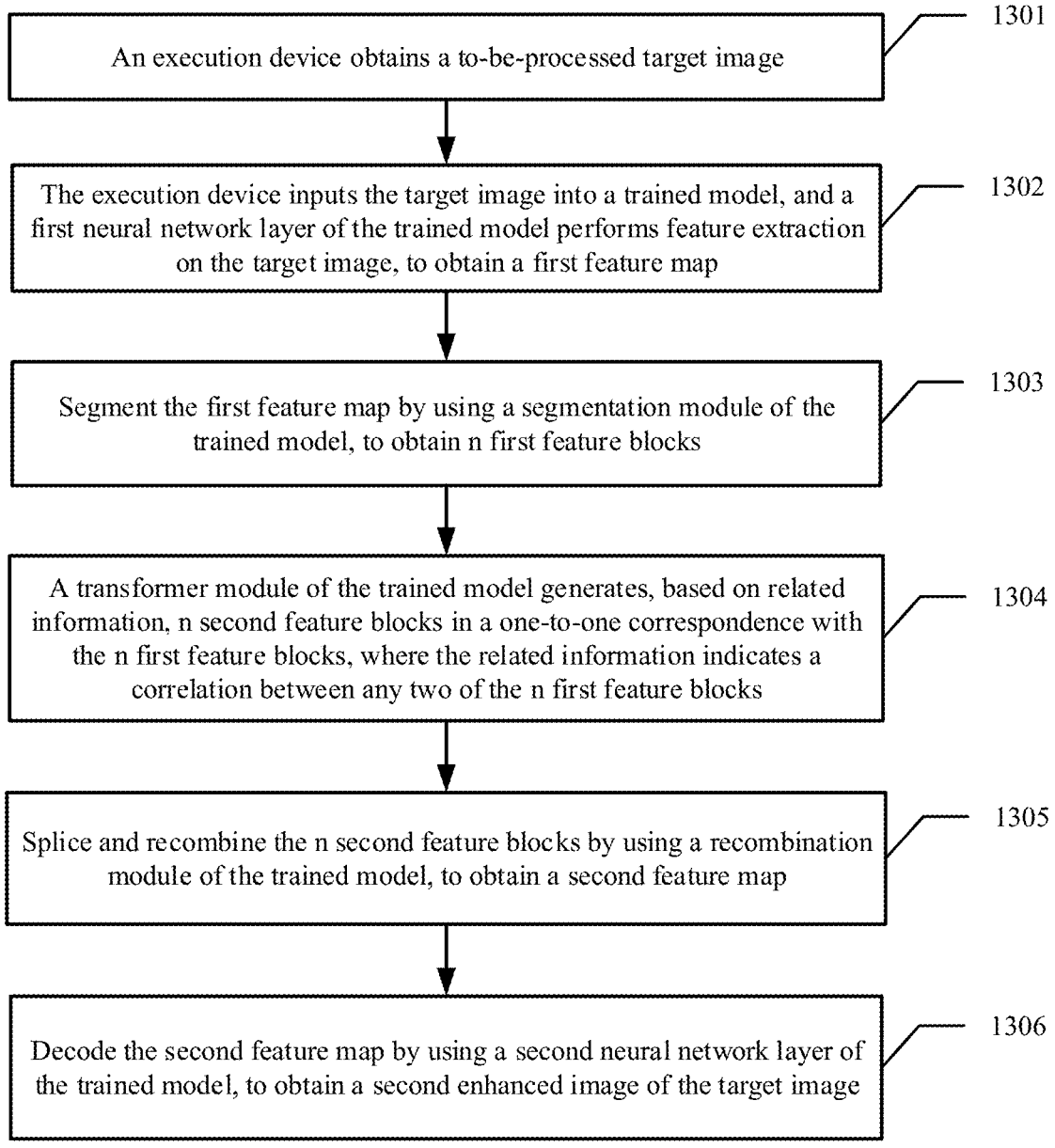

An execution device obtains a to-be-processed target image — 1301

The execution device inputs the target image into a trained model, and a first neural network layer of the trained model performs feature extraction on the target image, to obtain a first feature map — 1302

Segment the first feature map by using a segmentation module of the trained model, to obtain n first feature blocks — 1303

A transformer module of the trained model generates, based on related information, n second feature blocks in a one-to-one correspondence with the n first feature blocks, where the related information indicates a correlation between any two of the n first feature blocks — 1304

Splice and recombine the n second feature blocks by using a recombination module of the trained model, to obtain a second feature map — 1305

Decode the second feature map by using a second neural network layer of the trained model, to obtain a second enhanced image of the target image — 1306

FIG. 13

Blurred photo

Rainy photo

Photo with noise

Deblurred photo

Derained photo

Denoised photo

MODEL STRUCTURE, METHOD FOR TRAINING MODEL, IMAGE ENHANCEMENT METHOD, AND DEVICE

CROSS-REFERENCE TO RELATED APPLICATIONS

This application is a continuation of International Application No. PCT/CN2021/131704, filed on Nov. 19, 2021, which claims priority to Chinese Patent Application No. 202011382775.1, filed on Dec. 1, 2020. The disclosures of the aforementioned applications are hereby incorporated by reference in their entireties.

TECHNICAL FIELD

This application relates to the computer vision field, and in particular, to a model structure, a method for training a model, an image enhancement method, and a device.

BACKGROUND

Computer vision is an integral part of various intelligent/ autonomic systems in various application fields (such as manufacturing, inspection, document analysis, medical diagnosis, and military affairs). Computer vision is knowledge about how to use a camera/video camera and a computer to obtain required data and information of a photographed subject. Based on whether semantic information of an image needs to be used, a computer vision task may be classified into two types: a low-level vision task and a high-level vision task. The low-level vision task is usually a pixel-level image processing task, and the semantic information of the image does not need to be used, or a low-level feature (for example, an edge and a texture of the image) is used at most. These tasks include image enhancement (for example, denoising, deblurring, deraining, and super-resolution reconstruction), image encryption, and the like. The semantic information of the image needs to be used for the high-level vision task, and an extracted feature is a high-level feature. The task is, for example, target positioning, recognition, detection, classification, segmentation, and image generation for which a semantic feature is used.

Most existing models for processing the low-level vision task are based on a convolutional neural network (CNN). An image enhancement task is used as an example. As shown in a schematic subdiagram (a) in FIG. 1, one CNN is initialized, and then loss functions corresponding to different image enhancement tasks are formulated based on the different image enhancement tasks. The CNN is trained based on training data. After the CNN reaches a convergent state, training ends, a trained CNN is obtained, and finally, the obtained trained CNN is applied to a respectively-specified image enhancement task.

As a good feature extractor, the CNN plays an important role in the high-level vision task, but can hardly pay attention to global information when processing the low-level vision task. In addition, a corresponding CNN needs to be trained for each image enhancement task. As shown in a schematic subdiagram (b) in FIG. 1, if there are three different image enhancement tasks (denoising, defogging, and deraining), three different CNNs need to be correspondingly trained. The CNN is not universal.

SUMMARY

Embodiments of this application provide a model structure, a method for training a model, an image enhancement method, and a device. A transformer module configured to process a natural language task is combined with a different neural network structure to obtain a new model structure, to overcome a limitation that the transformer module can only be used to process the natural language task. The model structure may be applied to a low-level vision task. The model structure includes a plurality of first neural network layers and a plurality of second neural network layers, and different first/second neural network layers correspond to different image enhancement tasks. Therefore, after being trained, a model can be used to process different image enhancement tasks. In addition, compared with a manner in which most existing models that process the low-level vision task are based on a CNN (as a good feature extractor, the CNN plays an important role in a high-level vision task, but can hardly pay attention to global information when processing the low-level vision task), in this application, the model may pay attention to the global information by using the transformer module, to improve an image enhancement effect.

In view of this, embodiments of this application provide the following technical solutions:

According to a first aspect, an embodiment of this application first provides a model structure. The model structure may be applied to the computer vision field in the artificial intelligence field. The model structure includes a selection module, m first neural network layers, m second neural network layers, a segmentation module, a recombination module, and a transformer module. Each first neural network layer uniquely corresponds to one second neural network layer. Each first neural network layer may also be referred to as a head module or a head structure, and each second neural network layer may also be referred to as a tail module or a tail structure. Herein, m≥2. The selection module is configured to: obtain an input image, and determine a first target neural network layer corresponding to the input image. The first target neural network layer is one of the m first neural network layers. After determining, based on the input image, the first target neural network layer corresponding to the input image, the selection module of the model inputs the input image into the first target neural network layer. The first target neural network layer is configured to perform feature extraction on the input image, to obtain a feature map (which may be referred to as a first feature map). The obtained first feature map is further input into the segmentation module, and the segmentation module is configured to segment the first feature map, to obtain n feature blocks (which may be referred to as a first feature block). Herein, n≥2. After obtaining the n first feature blocks, the segmentation module further inputs the n first feature blocks into the transformer module for processing. The transformer module is configured to generate, based on related information, n second feature blocks in a one-to-one correspondence with the n first feature blocks. The related information indicates a correlation between any two of the n first feature blocks. To be specific, each first feature block not only has feature information of the first feature block, but also integrates feature information of another first feature block based on a correlation with the another first feature block. After obtaining the n second feature blocks based on the n first feature blocks and the related information, the transformer module sends the n second feature blocks to the recombination module. The recombination module is configured to splice and recombine the n second feature blocks based on a relative spatial location, to obtain a second feature map whose dimension is same as that of the input first feature map. An operation of the recombination module is an inverse operation of the segmentation module. The recombination module splices and recombines the n second feature blocks, to obtain the second feature map, and inputs the second feature map into a second target neural network layer uniquely corresponding to the first target neural network layer. The second target neural network layer is one of the m second neural network layers. The second target neural network layer is configured to decode the second feature map, to obtain an output image.

In the foregoing embodiments of this application, a transformer module configured to process a natural language task is combined with a different neural network structure to obtain a new model structure, to overcome a limitation that the transformer module can only be used to process the natural language task. The model structure may be applied to a low-level vision task. The model structure includes a plurality of first neural network layers and a plurality of second neural network layers, and different first/second neural network layers correspond to different image enhancement tasks. Therefore, after being trained, a model can be used to process different image enhancement tasks. In addition, compared with a manner in which most existing models that process the low-level vision task are based on a CNN (as a good feature extractor, the CNN plays an important role in a high-level vision task, but can hardly pay attention to global information when processing the low-level vision task), in this application, the model may pay attention to the global information by using the transformer module, to improve an image enhancement effect.

In an embodiment, after receiving the input image, the selection module determines a specific first neural network layer that needs to perform a feature extraction operation on the input image. Specifically, the selection module is configured to: determine a specific type of an image enhancement task to which the input image belongs, and then input the input image into a first neural network layer corresponding to the task. The image enhancement task to which the input image belongs may be referred to as a first image enhancement task. Assuming that the first image enhancement task corresponds to the first target neural network layer, the selection module is further configured to input the received input image into the first target neural network layer.

In the foregoing embodiments of this application, how the model selection module of the model determines, based on the first image enhancement task, the first target neural network layer corresponding to the input image is specifically described.

In an embodiment, when the model is in a training phase of the model, the input image is a training sample in a training set. In this case, for each training sample, a corresponding label indicates a specific type of an image enhancement task to which the training sample belongs, and the label indicates a specific first neural network layer that needs to extract a feature of the training sample. In this case, the selection module of the model may determine, based on the label of the training sample, that the training sample belongs to the first image enhancement task.

In the foregoing embodiments of this application, how the selection module determines, when the input image is a training sample, an image enhancement task corresponding to the training sample is specifically described.

In an embodiment, when the model is in an inference phase of the model, the input image is a real to-be-processed target image. In this process, in addition to receiving the input image, the selection module receives an instruction sent by a device on which the model is deployed. The instruction indicates a specific type of an image enhancement task to which the target image belongs. To be specific, in the inference phase, the selection module of the model determines, based on the received instruction, that the target image belongs to the first image enhancement task.

In the foregoing embodiments of this application, how the selection module determines, when the input image is the to-be-processed target image, an image enhancement task corresponding to the target image is specifically described.

In an embodiment, the transformer module includes an encoder and a decoder. In this case, that the transformer module generates the n second feature blocks in a one-to-one correspondence with the n first feature blocks based on the related information may be as follows: First, the encoder generates first related information, and generates, based on the first related information, n third feature blocks in a one-to-one correspondence with the n first feature blocks. The first related information indicates a first correlation between any two of the n first feature blocks, and a dimension of the n first feature blocks input into the encoder is the same as a dimension of the n third feature blocks. Then, the decoder generates second related information, and generates, based on the second related information, the n second feature blocks in a one-to-one correspondence with the n third feature blocks. The second related information indicates a second correlation between any two of the n third feature blocks, and a dimension of the n third feature blocks input into the decoder is the same as a dimension of the n second feature blocks. It should be noted herein that the second related information is fused with a first task code, and the first task code is used as an input into the decoder. The first task code is a corresponding identifier of the first image enhancement task, or may be considered as a corresponding identifier of the first target neural network layer. Each image enhancement task corresponds to one task code. Because an input image corresponding to each image enhancement task is input into a corresponding first neural network layer, based on the task code, both a specific image enhancement task of an input image from which the n first feature blocks received by the transformer module come and a specific first neural network layer that performs a feature extraction operation to obtain the n first feature blocks may be learned of.

In the foregoing embodiments of this application, how the transformer module specifically generates, based on the related information, the n second feature blocks in a one-to-one correspondence with the n first feature blocks is described.

In an embodiment, a process in which the segmentation module segments the first feature map may be specifically as follows: First, the first feature map is segmented to obtain n segmentation blocks, and then each of the n segmentation blocks is extended to obtain a feature block (that is, the first feature block) represented by a one-dimensional vector. In this way, the n first feature blocks may be obtained.

In the foregoing embodiments of this application, an execution process in which the segmentation module segments the first feature map is described.

In an embodiment, the segmentation module segments the first feature map, and sizes of the obtained n segmentation blocks may be the same, or may be different. This is not specifically limited herein. When the sizes of the obtained n segmentation blocks are the same, the transformer module may subsequently process the n segmentation blocks by using one self-attention module, to reduce a computation amount. When the sizes of the obtained n segmentation blocks are different, the transformer module subsequently needs to process the n segmentation blocks by using a plurality of self-attention modules. A quantity of different sizes (for example, x different sizes) needs to be the same as a quantity of at least x corresponding self-attention modules that need to be configured in the transformer module. However, when there are different segmentation sizes, an advantage is as follows: for a region (for example, a bird flying in the sky) for which more detail features are required, the segmentation module may obtain more small-size segmentation blocks through segmentation, and for a region (for example, the sky) for which a large quantity of detail features are not required, the segmentation module may obtain a small quantity of large-size segmentation blocks through segmentation. In this way, operations are flexible.

In the foregoing embodiments of this application, that the sizes of the n segmentation blocks obtained by the segmentation module through segmentation may be the same or may be different is described, and may be preset based on a requirement. There is selectivity.

A second aspect of embodiments of this application further provides a model structure. The model structure may specifically include a first neural network layer 1, a segmentation module, a transformer module, a recombination module, and a second neural network layer. The first neural network layer may also be referred to as a head module or a head structure, and the second neural network layer may also be referred to as a tail module or a tail structure. In this embodiment of this application, because there is only one first neural network layer and one second neural network layer, there is no selection module in the model. The first neural network layer is configured to perform feature extraction on an input image, to obtain a feature map (which may be referred to as a first feature map). Then, the first feature map is input into the segmentation module. The segmentation module is configured to segment the first feature map, to obtain n feature blocks (which may be referred to as a first feature block). Herein, $n \geq 2$. After obtaining the n first feature blocks, the segmentation module further inputs the n first feature blocks into the transformer module for processing. The transformer module generates related information based on the n first feature blocks. The related information indicates a correlation between any two of the n first feature blocks. Then, the transformer module generates, based on the related information, n second feature blocks in a one-to-one correspondence with the n first feature blocks. Each first feature block not only has feature information of the first feature block, but also integrates feature information of another first feature block based on a correlation with the another first feature block. After the transformer module obtains the n second feature blocks based on the n first feature blocks and the related information, the recombination module is configured to splice and recombine the n second feature blocks based on a relative spatial location, to obtain a second feature map whose dimension is same as that of the input first feature map. The recombination module splices and recombines the n second feature blocks to obtain a second feature map, and inputs the second feature map into a second neural network layer. The second neural network layer decodes the received second feature map to obtain an output image. The output image is an enhanced image that is of the input image and that is obtained after the model performs processing.

In the foregoing embodiments of this application, a transformer module configured to process a natural language task is combined with a different neural network structure to obtain a new model structure, to overcome a limitation that the transformer module can only be used to process the natural language task. The model structure may be applied to a low-level vision task. The model structure includes one first neural network layer and one second neural network layer, and is used to process a specific image enhancement task. Compared with a manner in which most existing models that process the low-level vision task are based on a CNN (as a good feature extractor, the CNN plays an important role in a high-level vision task, but can hardly pay attention to global information when processing the low-level vision task), in this application, the model may pay attention to the global information by using the transformer module, to improve an image enhancement effect.

In an embodiment, the transformer module includes an encoder and a decoder. In this case, that the transformer module generates the n second feature blocks in a one-to-one correspondence with the n first feature blocks based on the related information may be as follows: First, the encoder generates first related information, and generates, based on the first related information, n third feature blocks in a one-to-one correspondence with the n first feature blocks. The first related information indicates a first correlation between any two of the n first feature blocks, and a dimension of the n first feature blocks input into the encoder is the same as a dimension of the n third feature blocks. Then, the decoder generates second related information, and generates, based on the second related information, the n second feature blocks in a one-to-one correspondence with the n third feature blocks. The second related information indicates a second correlation between any two of the n third feature blocks, and a dimension of the n third feature blocks input into the decoder is the same as a dimension of the n second feature blocks. It should be noted herein that the second related information is fused with a first task code, and the first task code is used as an input into the decoder. The first task code is a corresponding identifier of an image enhancement task to which the input image belongs. Based on the task code, a specific image enhancement task of an input image from which the n first feature blocks received by the transformer module come may be learned of.

In the foregoing embodiments of this application, how the transformer module specifically generates, based on the related information, the n second feature blocks in a one-to-one correspondence with the n first feature blocks is described.

In an embodiment, a process in which the segmentation module segments the first feature map may be specifically as follows: First, the first feature map is segmented to obtain n segmentation blocks, and then each of the n segmentation blocks is extended to obtain a feature block (that is, the first feature block) represented by a one-dimensional vector. In this way, the n first feature blocks may be obtained.

In the foregoing embodiments of this application, an execution process in which the segmentation module segments the first feature map is described.

In an embodiment, the segmentation module segments the first feature map, and sizes of the obtained n segmentation blocks may be the same, or may be different. This is not specifically limited herein. When the sizes of the obtained n segmentation blocks are the same, the transformer module may subsequently process the n segmentation blocks by using one self-attention module, to reduce a computation amount. When the sizes of the obtained n segmentation blocks are different, the transformer module subsequently needs to process the n segmentation blocks by using a plurality of self-attention modules. A quantity of different sizes (for example, x different sizes) needs to be the same as a quantity of at least x corresponding self-attention modules that need to be configured in the transformer module. However, when there are different segmentation sizes, an advantage is as follows: for a region (for example, a bird flying in the sky) for which more detail features are required, the segmentation module may obtain more small-size segmentation blocks through segmentation, and for a region (for example, the sky) for which a large quantity of detail features are not required, the segmentation module may obtain a small quantity of large-size segmentation blocks through segmentation. In this way, operations are flexible.

In the foregoing embodiments of this application, that the sizes of the n segmentation blocks obtained by the segmentation module through segmentation may be same or may be different is described, and may be preset based on a requirement. There is selectivity.

A third aspect of embodiments of this application provides a method for training a model. The method includes: A training device first obtains a training sample from a constructed training set. The training sample is any degraded image in the constructed training set, and each degraded image is obtained by performing image degradation processing on a clean image. After obtaining the training sample, the training device inputs the training sample into the model, and a selection module of the model determines a first target neural network layer corresponding to the training sample. The first target neural network layer performs feature extraction on the training sample, to obtain a feature map (which may be referred to as a first feature map). The obtained first feature map is further input into a segmentation module of the model, and the segmentation module segments the first feature map, to obtain n feature blocks (which may be referred to as a first feature block). Herein, n≥2. After obtaining then first feature blocks, the segmentation module of the model further inputs the n first feature blocks into a transformer module of the model for processing. The transformer module generates related information based on the n first feature blocks. The related information indicates a correlation between any two of the n first feature blocks. Then, the transformer module generates, based on the related information, n second feature blocks in a one-to-one correspondence with the n first feature blocks. In other words, each first feature block not only has feature information of the first feature block, but also integrates feature information of another first feature block based on a correlation with the another first feature block. After the transformer module of the model obtains the n second feature blocks based on the n first feature blocks and the related information, a recombination module of the model splices and recombines the n second feature blocks based on a relative spatial location, to obtain a second feature map whose dimension is same as that of the input first feature map. The recombination module of the model splices and recombines the n second feature blocks, to obtain the second feature map, and inputs the second feature map into a second target neural network layer uniquely corresponding to the first target neural network layer. The second target neural network layer is one of m second neural network layers of the model. Then, the second target neural network layer decodes the received second feature map, to obtain an enhanced image (which may be referred to as a first enhanced image) of the training sample. After obtaining the first enhanced image output by the model, the training device trains the model based on the first enhanced image, the clean image, and a loss function, to obtain a trained model. The training sample is obtained by performing image degradation processing on the clean image. Therefore, it may be referred to as that the clean image corresponds to the training sample.

In the foregoing embodiment of this application, how to train a model constructed in this application to obtain a trained model is specifically described. The model combines a transformer module configured to process a natural language task and different neural network structures, to overcome a limitation that the transformer module can only be used to process the natural language task. The model structure may be applied to a low-level vision task. The model structure includes a plurality of first neural network layers and a plurality of second neural network layers, and different first/second neural network layers correspond to different image enhancement tasks. Therefore, after being trained, a model can be used to process different image enhancement tasks. In addition, compared with a manner in which most existing models that process the low-level vision task are based on a CNN (as a good feature extractor, the CNN plays an important role in a high-level vision task, but can hardly pay attention to global information when processing the low-level vision task), in this application, the model may pay attention to the global information by using the transformer module, to improve an image enhancement effect.

In an embodiment, because for each training sample, a corresponding label indicates a specific type of an image enhancement task to which the training sample belongs, the label indicates a specific first neural network layer that needs to extract a feature of the training sample. The selection module of the model may determine, based on the label of the training sample, that the training sample belongs to a first image enhancement task, and further determine a first target neural network layer corresponding to the first image enhancement task.

In the foregoing embodiments of this application, how the selection module determines an image enhancement task corresponding to the training sample is specifically described.

In an embodiment, the transformer module includes an encoder and a decoder. In this case, that the transformer module generates the n second feature blocks in a one-to-one correspondence with the n first feature blocks based on the related information may be as follows: First, the encoder generates first related information, and generates, based on the first related information, n third feature blocks in a one-to-one correspondence with the n first feature blocks. The first related information indicates a first correlation between any two of the n first feature blocks, and a dimension of the n first feature blocks input into the encoder is the same as a dimension of the n third feature blocks. Then, the decoder generates second related information, and generates, based on the second related information, the n second feature blocks in a one-to-one correspondence with the n third feature blocks. The second related information indicates a second correlation between any two of the n third feature blocks, and a dimension of the n third feature blocks input into the decoder is the same as a dimension of the n second feature blocks. It should be noted herein that the second related information is fused with a first task code, and the first task code is used as an input into the decoder. The first task code is a corresponding identifier of the first image enhancement task, or may be considered as a corresponding identifier of the first target neural network layer. Each image enhancement task corresponds to one task code. Because an input image corresponding to each image enhancement task is input into a corresponding first neural network layer, based on the task code, both a specific image enhancement task of an input image from which the n first feature blocks received by the transformer module come and a specific first neural network layer that performs a feature extraction operation to obtain the n first feature blocks may be learned of.

In the foregoing embodiments of this application, how the transformer module specifically generates, based on the related information, the n second feature blocks in a one-to-one correspondence with the n first feature blocks is described.

In an embodiment, a process in which the segmentation module segments the first feature map may be specifically as follows: First, the first feature map is segmented to obtain n segmentation blocks, and then each of the n segmentation blocks is extended to obtain a feature block (that is, the first feature block) represented by a one-dimensional vector. In this way, the n first feature blocks may be obtained.

In the foregoing embodiments of this application, an execution process in which the segmentation module segments the first feature map is described.

In an embodiment, the segmentation module segments the first feature map, and sizes of the obtained n segmentation blocks may be the same, or may be different. This is not specifically limited herein. When the sizes of the obtained n segmentation blocks are the same, the transformer module may subsequently process the n segmentation blocks by using one self-attention module, to reduce a computation amount. When the sizes of the obtained n segmentation blocks are different, the transformer module subsequently needs to process the n segmentation blocks by using a plurality of self-attention modules. A quantity of different sizes (for example, x different sizes) needs to be the same as a quantity of at least x corresponding self-attention modules that need to be configured in the transformer module. However, when there are different segmentation sizes, an advantage is as follows: for a region (for example, a bird flying in the sky) for which more detail features are required, the segmentation module may obtain more small-size segmentation blocks through segmentation, and for a region (for example, the sky) for which a large quantity of detail features are not required, the segmentation module may obtain a small quantity of large-size segmentation blocks through segmentation. In this way, operations are flexible.

In the foregoing embodiments of this application, that the sizes of the n segmentation blocks obtained by the segmentation module through segmentation may be the same or may be different is described, and may be preset based on a requirement. There is selectivity.

In an embodiment, the trained model may be deployed on a target device, for example, deployed on an edge device or an end-side device, for example, a mobile phone, a tablet computer, a notebook computer, or a supervision system (for example, a camera).

A fourth aspect of embodiments of this application further provides a method for training a model. The method may include: A training device obtains a training sample. The training sample is any degraded image in a constructed training set, and each degraded image in the training set is obtained by performing image degradation processing on a clean image. After obtaining the training sample, the training device inputs the training sample into the model, so that a first neural network layer of the model performs feature extraction on the training sample, to obtain a first feature map. The obtained first feature map is further input into a segmentation module of the model, and the segmentation module segments the first feature map, to obtain n feature blocks (which may be referred to as a first feature block).

Herein, n≥2. After obtaining the n first feature blocks, the segmentation module of the model further inputs the n first feature blocks into a transformer module of the model for processing. The transformer module generates related information based on the n first feature blocks. The related information indicates a correlation between any two of the n first feature blocks. Then, the transformer module generates, based on the related information, n second feature blocks in a one-to-one correspondence with the n first feature blocks. In other words, each first feature block not only has feature information of the first feature block, but also integrates feature information of another first feature block based on a correlation with the another first feature block. After the transformer module of the model obtains the n second feature blocks based on the n first feature blocks and the related information, a recombination module of the model splices and recombines the n second feature blocks based on a relative spatial location, to obtain a second feature map whose dimension is same as that of the input first feature map. The recombination module of the model splices and recombines the n second feature blocks, to obtain the second feature map, and inputs the second feature map into a second neural network layer. Then, the second neural network layer decodes the received second feature map, to obtain an enhanced image (which may be referred to as a first enhanced image) of the training sample.

In the foregoing embodiment of this application, how to train another model constructed in this application to obtain a trained model is specifically described. The trained model combines a transformer module configured to process a natural language task and different neural network structures, to overcome a limitation that the transformer module can only be used to process the natural language task. The model structure may be applied to a low-level vision task. The model structure includes one first neural network layer and one second neural network layer, and is used to process a specific image enhancement task. Compared with a manner in which most existing models that process the low-level vision task are based on a CNN (as a good feature extractor, the CNN plays an important role in a high-level vision task, but can hardly pay attention to global information when processing the low-level vision task), in this application, the model may pay attention to the global information by using the transformer module, to improve an image enhancement effect.

In an embodiment, the transformer module includes an encoder and a decoder. In this case, that the transformer module generates the n second feature blocks in a one-to-one correspondence with the n first feature blocks based on the related information may be as follows: First, the encoder generates first related information, and generates, based on the first related information, n third feature blocks in a one-to-one correspondence with the n first feature blocks. The first related information indicates a first correlation between any two of the n first feature blocks, and a dimension of the n first feature blocks input into the encoder is the same as a dimension of the n third feature blocks. Then, the decoder generates second related information, and generates, based on the second related information, the n second feature blocks in a one-to-one correspondence with the n third feature blocks. The second related information indicates a second correlation between any two of the n third feature blocks, and a dimension of the n third feature blocks input into the decoder is the same as a dimension of the n second feature blocks. It should be noted herein that the second related information is fused with a first task code, and the first task code is used as an input into the decoder.

The first task code is a corresponding identifier of an image enhancement task to which the input image belongs. Based on the task code, a specific image enhancement task of an input image from which the n first feature blocks received by the transformer module come may be learned of.

In the foregoing embodiments of this application, how the transformer module specifically generates, based on the related information, the n second feature blocks in a one-to-one correspondence with the n first feature blocks is described.

In an embodiment, a process in which the segmentation module segments the first feature map may be specifically as follows: First, the first feature map is segmented to obtain n segmentation blocks, and then each of the n segmentation blocks is extended to obtain a feature block (that is, the first feature block) represented by a one-dimensional vector. In this way, the n first feature blocks may be obtained.

In the foregoing embodiments of this application, an execution process in which the segmentation module segments the first feature map is described.

In an embodiment, the segmentation module segments the first feature map, and sizes of the obtained n segmentation blocks may be the same, or may be different. This is not specifically limited herein. When the sizes of the obtained n segmentation blocks are the same, the transformer module may subsequently process the n segmentation blocks by using one self-attention module, to reduce a computation amount. When the sizes of the obtained n segmentation blocks are different, the transformer module subsequently needs to process the n segmentation blocks by using a plurality of self-attention modules. A quantity of different sizes (for example, x different sizes) needs to be the same as a quantity of at least x corresponding self-attention modules that need to be configured in the transformer module. However, when there are different segmentation sizes, an advantage is as follows: for a region (for example, a bird flying in the sky) for which more detail features are required, the segmentation module may obtain more small-size segmentation blocks through segmentation, and for a region (for example, the sky) for which a large quantity of detail features are not required, the segmentation module may obtain a small quantity of large-size segmentation blocks through segmentation. In this way, operations are flexible.

In the foregoing embodiments of this application, that the sizes of the n segmentation blocks obtained by the segmentation module through segmentation may be the same or may be different is described, and may be preset based on a requirement. There is selectivity.

In an embodiment, the trained model may be deployed on a target device, for example, deployed on an edge device or an end-side device, for example, a mobile phone, a tablet computer, a notebook computer, or a supervision system (for example, a camera).

A fifth aspect of embodiments of this application provides an image enhancement method. The method includes: An execution device (that is, the foregoing target device) obtains a to-be-processed target image, for example, an image photographed by a mobile phone by using a camera, or an image photographed by a surveillance device by using a camera. A trained model is deployed on the execution device. After obtaining the target image, the execution device inputs the target image into the trained model. A selection module of the trained model determines a first target neural network layer corresponding to the target image. The first target neural network layer is one of m first neural network layers of the trained model. The first target neural network layer performs feature extraction on the target image, to obtain a feature map (which may be referred to as a first feature map). The obtained first feature map is further input into a segmentation module of the trained model, and the segmentation module segments the first feature map, to obtain n feature blocks (which may be referred to as a first feature block). Herein, n≥2. After obtaining the n first feature blocks, the segmentation module of the trained model further inputs the n first feature blocks into a transformer module of the trained model for processing. The transformer module generates related information based on the n first feature blocks. The related information indicates a correlation between any two of the n first feature blocks. Then, the transformer module generates, based on the related information, n second feature blocks in a one-to-one correspondence with the n first feature blocks. In other words, each first feature block not only has feature information of the first feature block, but also integrates feature information of another first feature block based on a correlation with the another first feature block. After the transformer module of the trained model obtains the n second feature blocks based on the n first feature blocks and the related information, a recombination module of the trained model splices and recombines the n second feature blocks based on a relative spatial location, to obtain a second feature map whose dimension is same as that of the input first feature map. The recombination module of the trained model splices and recombines the n second feature blocks, to obtain the second feature map, and inputs the second feature map into a second target neural network layer uniquely corresponding to the first target neural network layer. The second target neural network layer is one of m second neural network layers of the trained model. Then, the second target neural network layer decodes the received second feature map, to obtain an enhanced image (which may be referred to as a second enhanced image) of the target image.

In the foregoing embodiment of this application, how to actually apply the trained model in this application to obtain the enhanced image corresponding to the target image is specifically described. The trained model combines a transformer module configured to process a natural language task and different neural network structures, to overcome a limitation that the transformer module can only be used to process the natural language task. The model structure may be applied to a low-level vision task. The model structure includes a plurality of first neural network layers and a plurality of second neural network layers, and different first/second neural network layers correspond to different image enhancement tasks. Therefore, after being trained, a model can be used to process different image enhancement tasks. In addition, compared with a manner in which most existing models that process the low-level vision task are based on a CNN (as a good feature extractor, the CNN plays an important role in a high-level vision task, but can hardly pay attention to global information when processing the low-level vision task), in this application, the model may pay attention to the global information by using the transformer module, to improve an image enhancement effect.

In an embodiment, because a real to-be-processed target image does not have a label, the trained model cannot sense a specific type of an image enhancement task corresponding to the target image. In this case, the execution device additionally sends an instruction to the trained model. The instruction indicates a specific type of an image enhancement task to which the target image belongs. To be specific, in an inference phase, the selection module of the trained model determines, based on the received instruction, that the target image belongs to a first image enhancement task, and further determines a first target neural network layer corresponding to the first image enhancement task.

In the foregoing embodiments of this application, how the selection module determines an image enhancement task corresponding to the target image is specifically described.

In an embodiment, the transformer module includes an encoder and a decoder. In this case, that the transformer module generates the n second feature blocks in a one-to-one correspondence with the n first feature blocks based on the related information may be as follows: First, the encoder generates first related information, and generates, based on the first related information, n third feature blocks in a one-to-one correspondence with the n first feature blocks. The first related information indicates a first correlation between any two of the n first feature blocks, and a dimension of the n first feature blocks input into the encoder is the same as a dimension of the n third feature blocks. Then, the decoder generates second related information, and generates, based on the second related information, the n second feature blocks in a one-to-one correspondence with the n third feature blocks. The second related information indicates a second correlation between any two of the n third feature blocks, and a dimension of the n third feature blocks input into the decoder is the same as a dimension of the n second feature blocks. It should be noted herein that the second related information is fused with a first task code, and the first task code is used as an input into the decoder. The first task code is a corresponding identifier of the first image enhancement task, or may be considered as a corresponding identifier of the first target neural network layer. Each image enhancement task corresponds to one task code. Because an input image corresponding to each image enhancement task is input into a corresponding first neural network layer, based on the task code, both a specific image enhancement task of an input image from which the n first feature blocks received by the transformer module come and a specific first neural network layer that performs a feature extraction operation to obtain the n first feature blocks may be learned of.

In the foregoing embodiments of this application, how the transformer module specifically generates, based on the related information, the n second feature blocks in a one-to-one correspondence with the n first feature blocks is described.

In an embodiment, a process in which the segmentation module segments the first feature map may be specifically as follows: First, the first feature map is segmented to obtain n segmentation blocks, and then each of the n segmentation blocks is extended to obtain a feature block (that is, the first feature block) represented by a one-dimensional vector. In this way, the n first feature blocks may be obtained.

In the foregoing embodiments of this application, an execution process in which the segmentation module segments the first feature map is described.

In an embodiment, the segmentation module segments the first feature map, and sizes of the obtained n segmentation blocks may be the same, or may be different. This is not specifically limited herein. When the sizes of the obtained n segmentation blocks are the same, the transformer module may subsequently process the n segmentation blocks by using one self-attention module, to reduce a computation amount. When the sizes of the obtained n segmentation blocks are different, the transformer module subsequently needs to process the n segmentation blocks by using a plurality of self-attention modules. A quantity of different sizes (for example, x different sizes) needs to be the same as a quantity of at least x corresponding self-attention modules that need to be configured in the transformer module. However, when there are different segmentation sizes, an advantage is as follows: for a region (for example, a bird flying in the sky) for which more detail features are required, the segmentation module may obtain more small-size segmentation blocks through segmentation, and for a region (for example, the sky) for which a large quantity of detail features are not required, the segmentation module may obtain a small quantity of large-size segmentation blocks through segmentation. In this way, operations are flexible.

In the foregoing embodiments of this application, that the sizes of the n segmentation blocks obtained by the segmentation module through segmentation may be the same or may be different is described, and may be preset based on a requirement. There is selectivity.

A sixth aspect of embodiments of this application provides an image enhancement method. The method includes: An execution device (that is, the foregoing target device) obtains a to-be-processed target image, for example, an image photographed by a mobile phone by using a camera, or an image photographed by a surveillance device by using a camera. A trained model is deployed on the execution device. After obtaining the target image, the execution device inputs the target image into the trained model. A first neural network layer of the trained model performs feature extraction on the target image, to obtain a first feature map. The obtained first feature map is further input into a segmentation module of the trained model, and the segmentation module segments the first feature map, to obtain n feature blocks (which may be referred to as a first feature block). Herein, $n \geq 2$. After obtaining the n first feature blocks, the segmentation module of the trained model further inputs the n first feature blocks into a transformer module of the trained model for processing. The transformer module generates related information based on the n first feature blocks. The related information indicates a correlation between any two of the n first feature blocks. Then, the transformer module generates, based on the related information, n second feature blocks in a one-to-one correspondence with the n first feature blocks. In other words, each first feature block not only has feature information of the first feature block, but also integrates feature information of another first feature block based on a correlation with the another first feature block. After the transformer module of the trained model obtains the n second feature blocks based on the n first feature blocks and the related information, a recombination module of the trained model splices and recombines the n second feature blocks based on a relative spatial location, to obtain a second feature map whose dimension is same as that of the input first feature map. The recombination module of the trained model splices and recombines the n second feature blocks, to obtain the second feature map, and inputs the second feature map into a second neural network layer. Then, the second neural network layer decodes the received second feature map, to obtain an enhanced image (which may be referred to as a second enhanced image) of the training sample.

In the foregoing embodiment of this application, how to actually apply the trained model in this application to obtain the enhanced image corresponding to the target image is specifically described. The trained model combines a transformer module configured to process a natural language task and different neural network structures, to overcome a limitation that the transformer module can only be used to process the natural language task. The model structure may be applied to a low-level vision task. The model structure includes one first neural network layer and one second neural network layer, and is used to process a specific image enhancement task. Compared with a manner in which most existing models that process the low-level vision task are based on a CNN (as a good feature extractor, the CNN plays an important role in a high-level vision task, but can hardly pay attention to global information when processing the low-level vision task), in this application, the model may pay attention to the global information by using the transformer module, to improve an image enhancement effect.

In an embodiment, the transformer module includes an encoder and a decoder. In this case, that the transformer module generates the n second feature blocks in a one-to-one correspondence with the n first feature blocks based on the related information may be as follows: First, the encoder generates first related information, and generates, based on the first related information, n third feature blocks in a one-to-one correspondence with the n first feature blocks. The first related information indicates a first correlation between any two of the n first feature blocks, and a dimension of the n first feature blocks input into the encoder is the same as a dimension of the n third feature blocks. Then, the decoder generates second related information, and generates, based on the second related information, the n second feature blocks in a one-to-one correspondence with the n third feature blocks. The second related information indicates a second correlation between any two of the n third feature blocks, and a dimension of the n third feature blocks input into the decoder is the same as a dimension of the n second feature blocks. It should be noted herein that the second related information is fused with a first task code, and the first task code is used as an input into the decoder. The first task code is a corresponding identifier of an image enhancement task to which the input image belongs. Based on the task code, a specific image enhancement task of an input image from which the n first feature blocks received by the transformer module come may be learned of.

In the foregoing embodiments of this application, how the transformer module specifically generates, based on the related information, the n second feature blocks in a one-to-one correspondence with the n first feature blocks is described.

In an embodiment, a process in which the segmentation module segments the first feature map may be specifically as follows: First, the first feature map is segmented to obtain n segmentation blocks, and then each of the n segmentation blocks is extended to obtain a feature block (that is, the first feature block) represented by a one-dimensional vector. In this way, the n first feature blocks may be obtained.

In the foregoing embodiments of this application, an execution process in which the segmentation module segments the first feature map is described.

In an embodiment, the segmentation module segments the first feature map, and sizes of the obtained n segmentation blocks may be the same, or may be different. This is not specifically limited herein. When the sizes of the obtained n segmentation blocks are the same, the transformer module may subsequently process the n segmentation blocks by using one self-attention module, to reduce a computation amount. When the sizes of the obtained n segmentation blocks are different, the transformer module subsequently needs to process the n segmentation blocks by using a plurality of self-attention modules. A quantity of different sizes (for example, x different sizes) needs to be the same as a quantity of at least x corresponding self-attention modules that need to be configured in the transformer module. However, when there are different segmentation sizes, an advantage is as follows: for a region (for example, a bird flying in the sky) for which more detail features are required, the segmentation module may obtain more small-size segmentation blocks through segmentation, and for a region (for example, the sky) for which a large quantity of detail features are not required, the segmentation module may obtain a small quantity of large-size segmentation blocks through segmentation. In this way, operations are flexible.

In the foregoing embodiments of this application, that the sizes of the n segmentation blocks obtained by the segmentation module through segmentation may be the same or may be different is described, and may be preset based on a requirement. There is selectivity.

A seventh aspect of embodiments of this application provides a training device. The training device has a function of implementing the method in any one of the third/fourth aspect or the possible implementations of the third/fourth aspect. The function may be implemented by hardware, or may be implemented by hardware executing corresponding software. The hardware or software includes one or more modules corresponding to the foregoing function.

An eighth aspect of embodiments of this application provides an execution device. The execution device has a function of implementing the method in any one of the fifth/sixth aspect or the possible implementations of the fifth/sixth aspect. The function may be implemented by hardware, or may be implemented by hardware executing corresponding software. The hardware or software includes one or more modules corresponding to the foregoing function.

A ninth aspect of embodiments of this application provides a training device. The training device may include a memory, a processor, and a bus system. The memory is configured to store a program. The processor is configured to invoke the program stored in the memory, to perform the method in any one of the third/fourth aspect or the possible implementations of the third/fourth aspect of embodiments of this application.

A tenth aspect of embodiments of this application provides an execution device. The execution device may include a memory, a processor, and a bus system. The memory is configured to store a program. The processor is configured to invoke the program stored in the memory, to perform the method in any one of the fifth/sixth aspect or the possible implementations of the fifth/sixth aspect of embodiments of this application.

An eleventh aspect of this application provides a computer-readable storage medium. The computer-readable storage medium stores instructions. When the instructions are run on a computer, the computer may be enabled to perform the method in any one of the third/fourth aspect or the possible implementations of the third/fourth aspect, or the computer may be enabled to perform the method in any one of the fifth/sixth aspect or the possible implementations of the fifth/sixth aspect.

A twelfth aspect of embodiments of this application provides a computer program. When the computer program runs on a computer, the computer may be enabled to perform the method in any one of the third/fourth aspect or the possible implementations of the third/fourth aspect, or the computer may be enabled to perform the method in any one of the fifth/sixth aspect or the possible implementations of the fifth/sixth aspect.

A thirteenth aspect of embodiments of this application provides a chip. The chip includes at least one processor and at least one interface circuit, the interface circuit is coupled to the processor, the at least one interface circuit is configured to: perform a transceiver function, and send instructions to the at least one processor, and the at least one processor is configured to run a computer program or instructions, and has a function of implementing the method in any one of the third/fourth aspect or the possible implementations of the third/fourth aspect, or has a function of implementing the method in any one of the fifth/sixth aspect or the possible implementations of the fifth/sixth aspect. The function may be implemented by hardware, or may be implemented by software, or may be implemented by a combination of hardware and software. The hardware or the software includes one or more modules corresponding to the function.

BRIEF DESCRIPTION OF DRAWINGS

FIG. 1 is a schematic diagram of processing a low-level vision task based on a CNN;

FIG. 10 is a schematic flowchart of a method for training a model according to an embodiment of this application;

FIG. 11 is another schematic flowchart of a method for training a model according to an embodiment of this application;

FIG. 12 is a schematic flowchart of an image enhancement method according to an embodiment of this application;

FIG. 13 is another schematic flowchart of an image enhancement method according to an embodiment of this application;

DESCRIPTION OF EMBODIMENTS

Figure 2:
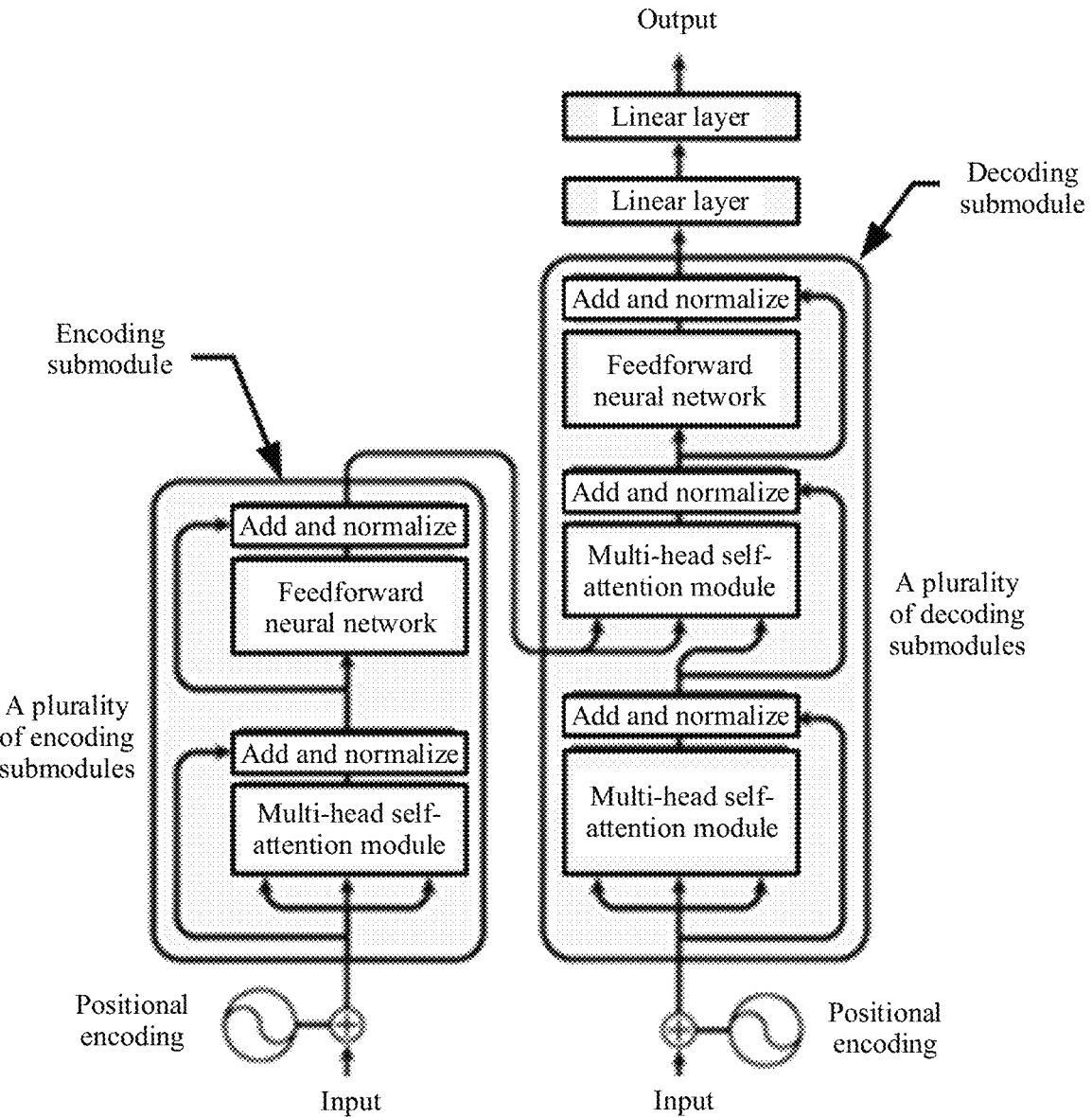
FIG. 2 is a schematic diagram of a standard structure of a transformer module.

Embodiments of this application provide a model structure, a method for training a model, an image enhancement method, and a device. A transformer module configured to process a natural language task is combined with a different neural network structure to obtain a new model structure, to overcome a limitation that the transformer module can only be used to process the natural language task. The model structure may be applied to a low-level vision task. The model structure includes a plurality of first neural network layers and a plurality of second neural network layers, and different first/second neural network layers correspond to different image enhancement tasks. Therefore, after being trained, a model can be used to process different image enhancement tasks. In addition, compared with a manner in which most existing models that process the low-level vision task are based on a CNN (as a good feature extractor, the CNN plays an important role in a high-level vision task, but can hardly pay attention to global information when processing the low-level vision task), in this application, the model may pay attention to the global information by using the transformer module, to improve an image enhancement effect.

In the specification, claims, and the accompanying drawings of this application, the terms such as "first" and "second" are intended to distinguish similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include" and "contain" and any other variants mean to cover the non-exclusive inclusion, so that a process, method, system, product, or device that includes a series of units is not necessarily limited to those units, but may include other units not expressly listed or inherent to such a process, method, product, or device.

Because embodiments of this application relate to much related knowledge about a neural network, a model, and the like, to better understand the solutions in embodiments of this application, the following first describes related terms and concepts that may be used in embodiments of this application. It should be understood that explanations of related concepts may be limited due to specific situations of embodiments of this application, but it does not mean that this application can only be limited to the specific situations. There may be differences in the specific situations of different embodiments. Details are not limited herein.

(1) Neural Network

The neural network is a model. The neural network may include a neural unit, and may be specifically understood as a neural network including an input layer, a hidden layer, and an output layer. Usually, a first layer is the input layer, a last layer is the output layer, and a middle layer is the hidden layer. A neural network including a plurality of hidden layers is referred to as a deep neural network (DNN). Work at each layer of the neural network may be described by using a mathematical expression $\vec{y} = a(W \cdot \vec{x} + b)$. From a physical layer, work at each layer of the neural network may be understood as completing transformation from input space to output space (namely, from row space to column space of a matrix) by performing five operations on the input space (a set of input vectors). The five operations include: 1. dimension increasing/dimension reduction; 2. scaling up/scaling down; 3. rotation; 4. translation; and 5. "bending". The operations 1, 2, and 3 are completed by $W \cdot \vec{x}$, the operation 4 is completed by "+b", and the operation 5 is implemented by a( ) The word "space" is used herein for expression because a classified object is not a single thing, but a type of thing. Space is a set of all individuals of such a type of thing. W is a weight matrix of each layer of the neural network, and each value in the matrix indicates a weight value of one neuron at the layer. The matrix W determines space transformation from the input space to the output space described above. In other words, W at each layer of the neural network controls how to transform space. A purpose of training the neural network is to finally obtain a weight matrix at all layers of a trained neural network. Therefore, a training process of the neural network is essentially a manner of learning of control of space transformation, and more specifically, learning of a weight matrix.

(2) Model

In embodiments of this application, a model used to process an image enhancement task is essentially a neural network or a model whose partial structure is a neural network. Application of the model usually includes two phases: a training phase and an inference phase. The training phase is used to train the model based on a training set, to obtain a trained model. The inference phase is used to perform image enhancement processing on a real unlabeled instance (that is, a real to-be-processed target image) by using the trained model. Quality of an enhanced image obtained after image enhancement processing is one of important indicators for measuring the trained model.

(3) Convolutional Neural Network (CNN)

The CNN is a neural network with a convolutional structure. The CNN includes a feature extractor including a convolutional layer and a subsampling layer. The feature extractor may be considered as a filter. A convolution process may be considered as performing convolution on an input image or a convolutional feature plane (feature map) by using trainable filter. The convolutional layer is a neuron layer that is in the CNN and at which convolution processing is performed on an input signal. At the convolutional layer of the CNN, one neuron may be connected only to some adjacent-layer neurons. One convolutional layer usually includes several feature planes, and each feature plane may include some neural units that are in a rectangular arrangement. Neural units in a same feature plane share a weight, and the weight shared herein is a convolution kernel. Weight sharing may be understood as that an image information extraction manner is irrelevant to a location. A principle implied herein is that statistical information of a part of an image is the same as that of another part. This means that image information learned from a part can also be used in another part. Therefore, the same image information obtained through learning can be used for all locations on the image. At a same convolutional layer, a plurality of convolution kernels may be used to extract different image information. Usually, a larger quantity of convolution kernels indicates richer image information reflected by performing a convolution operation.

The convolution kernel may be initialized in a form of a matrix of a random size. In a training process of the CNN, the convolution kernel may obtain a proper weight through learning. In addition, benefits directly brought by weight sharing are that connections among layers of the convolutional neural network are reduced, and an overfitting risk is reduced.

(4) Loss Function

In a process of training a neural network, because it is expected that an output of the neural network is as close as possible to a value that actually needs to be predicted, a current predicted value of the network and an actually expected target value may be compared, and then a weight matrix of each layer of the neural network is updated based on a difference between the current predicted value and the target value (certainly, there is usually an initialization process before a first update, to be specific, parameters are preconfigured for all layers of the neural network). For example, if the predicted value of the network is large, the weight matrix is adjusted to decrease the predicted value, and adjustment is continuously performed, until the neural network can predict the actually expected target value. Therefore, "how to obtain a difference between the predicted value and the target value through comparison" needs to be predefined. This is a loss function or an objective function. The loss function and the objective function are important equations for measuring the difference between the predicted value and the target value. The loss function is used as an example. A higher output value (loss) of the loss function indicates a larger difference. Therefore, training of the neural network is a process of minimizing the loss as much as possible.

(5) Back Propagation Algorithm

In a training process of a neural network, a value of a parameter of a neural network model may be corrected by using an error back propagation (BP) algorithm, so that a reconstruction error loss of the neural network model becomes increasingly smaller. Specifically, an input signal is forward transferred until the error loss is generated in an output, and the parameter of the neural network model is updated through back propagation of information about the error loss, to converge the error loss. The back propagation algorithm is an error-loss-centered back propagation motion intended to obtain a parameter, such as a weight matrix, of an optimal neural network model.

(6) Self-Attention Module and Multi-Head Self-Attention Module

The self-attention module is a structure of a neural network, and is characterized by computing a correlation between units in an input module (the self-attention module is initially used during natural language processing, and in this case, each unit is each word) and capturing information between input units based on the correlation.

Specifically, for an input unit, the self-attention module first converts the input unit into three vectors $\hat{q}$, $\hat{k}$, and $\hat{v}$, and then respectively multiplies the three vectors by three weight matrices to obtain three new vectors q, k, and v. The three different weight matrices may be denoted as Q, K, and V. For an input unit i, a correlation between the input unit i and another unit j may be computed based on a formula $s_{ij}=q_i \cdot k_j$. Then, a normalization operation is performed on the correlation $s_{ij}$. To be specific, the input unit i is first divided by $\sqrt{d_k}$. Herein, $d_k$ is a dimension of a vector k, and then a softmax operation is performed on the correlation $s_{ij}$ obtained after the input unit i is divided by $\sqrt{d_k}$, to obtain a correlation $$s'_{ij} = \frac{e^{s_{ij}}}{\sum_j e^{s_{ij}}}$$

after the operation. Dot multiplication is performed on a vector v of each input unit based on the correlation $s_{ij}'$, and an output result of the input unit may be obtained by performing addition. A computing formula is as follows: $z_i=\sum_j s_{ij}' \cdot v_j$. $z_i$ is an output of the input unit i. Similarly, such an operation is also performed on the other input units.

In actual use, the multi-head self-attention module is usually used. To be specific, for an input unit, the input unit is first segmented into h blocks, and the h blocks are respectively input into h self-attention modules, to obtain h outputs z. Then, the outputs z are re-spliced in a segmentation manner, and pass through a layer of fully connected network, to obtain a final output. The foregoing process may be recorded as MSA ($\hat{q}$, $\hat{k}$, $\hat{v}$).

(7) Transformer Module

The transformer module may also be referred to as a transformer model, a transformer structure, or the like, and is a multi-layer neural network based on a self-attention module. Currently, the transformer module is mainly configured to process a natural language task. The transformer module mainly includes a multi-head self-attention module (also referred to as an MSA module) and a feedforward neural network (FFN) that are stacked. The transformer module may be further divided into an encoder and a decoder (which may also be referred to as an encoding module and a decoding module), and compositions of the transformer module are roughly similar and are also different.

A standard composition structure of the transformer module is shown in FIG. 2. An encoder is on the left, and a decoder is on the right. Each encoder may include any quantity of encoding submodules, and each encoding submodule includes one multi-head self-attention module and one feedforward neural network. Similarly, each decoder may include any quantity of decoding submodules, and each decoding submodule includes two multi-head self-attention modules and one feedforward neural network. A quantity of encoding submodules may be different from a quantity of decoding submodules. Currently, the transformer module is configured to process the natural language task, and cannot be directly applied to a computer vision task. In other words, inputs into the encoder and the decoder of the transformer module are code of words.

The following describes embodiments of this application with reference to accompanying drawings. It may be learned by a person of ordinary skill in the art that, with development of a technology and emergence of a new scenario, the technical solutions provided in embodiments of this application are also applicable to similar technical problems.

Figure 3:
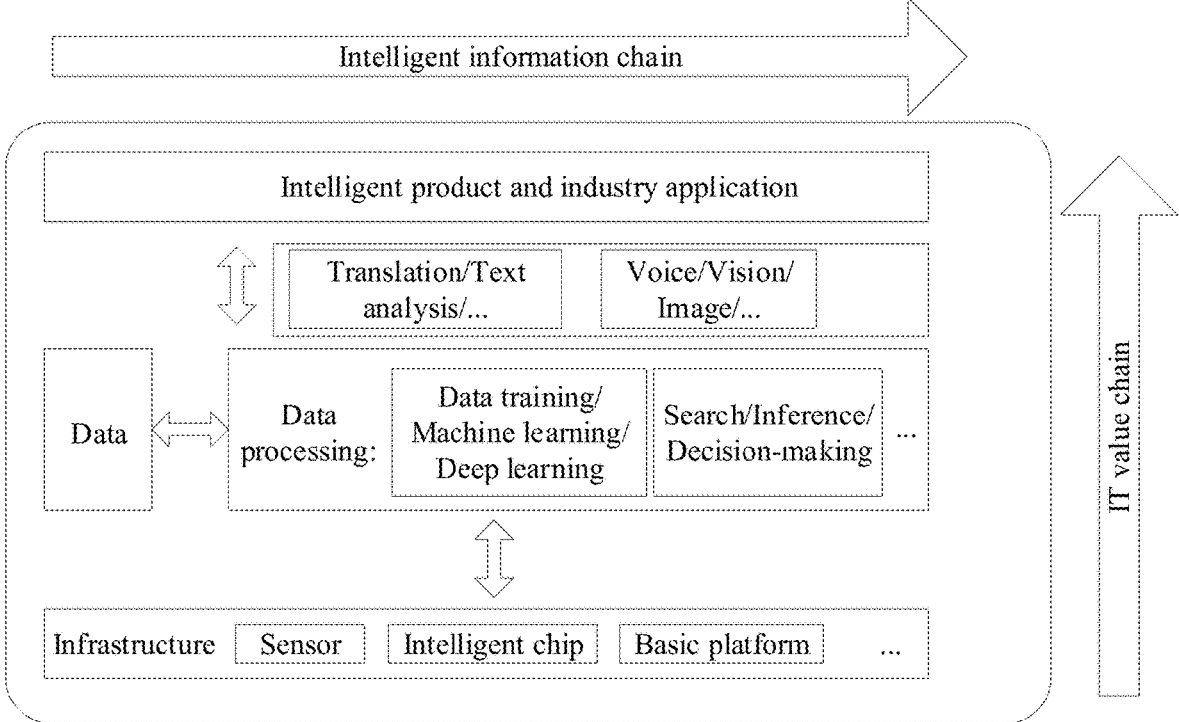
FIG. 3 is a schematic diagram of a structure of an artificial intelligence main framework according to an embodiment of this application.

An overall working procedure of an artificial intelligence system is first described. FIG. 3 is a schematic diagram of a structure of an artificial intelligence main framework. The following describes the artificial intelligence main framework from two dimensions: an "intelligent information chain" (horizontal axis) and an "IT value chain" (vertical axis). The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, the data undergoes a refinement process of "data-information-knowledge-intelligence". The "IT value chain" reflects a value brought by artificial intelligence to the information technology industry from an underlying infrastructure and information (technology providing and processing implementation) of artificial intelligence to an industrial ecological process of a system.

(1) Infrastructure

The infrastructure provides computing capability support for the artificial intelligence system, implements communication with an external world, and implements support by using a basic platform. The infrastructure communicates with the outside by using a sensor. A computing capability is provided by an intelligent chip (a hardware acceleration chip such as a CPU, an NPU, a GPU, an ASIC, or an FPGA). The basic platform includes related platforms such as a distributed computing framework and a network for assurance and support, including cloud storage and computing, an interconnection network, and the like. For example, the sensor communicates with the outside to obtain data, and the data is provided to an intelligent chip in a distributed computing system provided by the basic platform for computing.

(2) Data

Data at an upper layer of the infrastructure indicates a data source in the artificial intelligence field. The data relates to a graph, an image, voice, and text, further relates to Internet of things data of a conventional device, and includes service data of an existing system and perception data such as force, displacement, a liquid level, a temperature, and humidity.

(3) Data Processing

Data processing usually includes a manner such as data training, machine learning, deep learning, searching, inference, or decision-making.

Machine learning and deep learning may be performing symbolic and formalized intelligent information modeling, extraction, preprocessing, training, and the like on data.

Inference is a process in which a human intelligent inference manner is simulated in a computer or an intelligent system, and machine thinking and problem resolving are performed by using formal information based on an inference control policy. A typical function is searching and matching.

Decision-making is a process in which a decision is made after intelligent information is inferred, and usually provides functions such as classification, ranking, and prediction.

(4) General Capability

After data processing mentioned above is performed on data, some general capabilities may further be formed based on a data processing result, for example, an algorithm or a general system such as translation, text analysis, computer vision processing, speech recognition, and image recognition.

(5) Intelligent Product and Industry Application

The intelligent product and the industry application are a product and an application of the artificial intelligence system in various fields, and are package of an overall solution of the artificial intelligence, so that decision-making for intelligent information is productized and an application is implemented. Application fields thereof mainly include an intelligent terminal, intelligent manufacturing, intelligent transportation, intelligent home, intelligent healthcare, an intelligent camera, autonomous driving, a safe city, and the like.

Embodiments of this application may be applied to a network structure optimization design of a model, and a model whose structure is optimized in this application may be specifically applied to various subdivision fields in the artificial intelligence field, for example, an image processing field and a semantic analysis field in the computer vision field.

A model structure provided in embodiments of this application is first described. In embodiments of this application, there may be two different model structures based on whether the provided model may process a plurality of image enhancement tasks or process a single image enhancement task. The following separately describes the model structures.

1. A model structure includes m first neural network layers and m second neural network layers, where m≥2.

Figure 4:
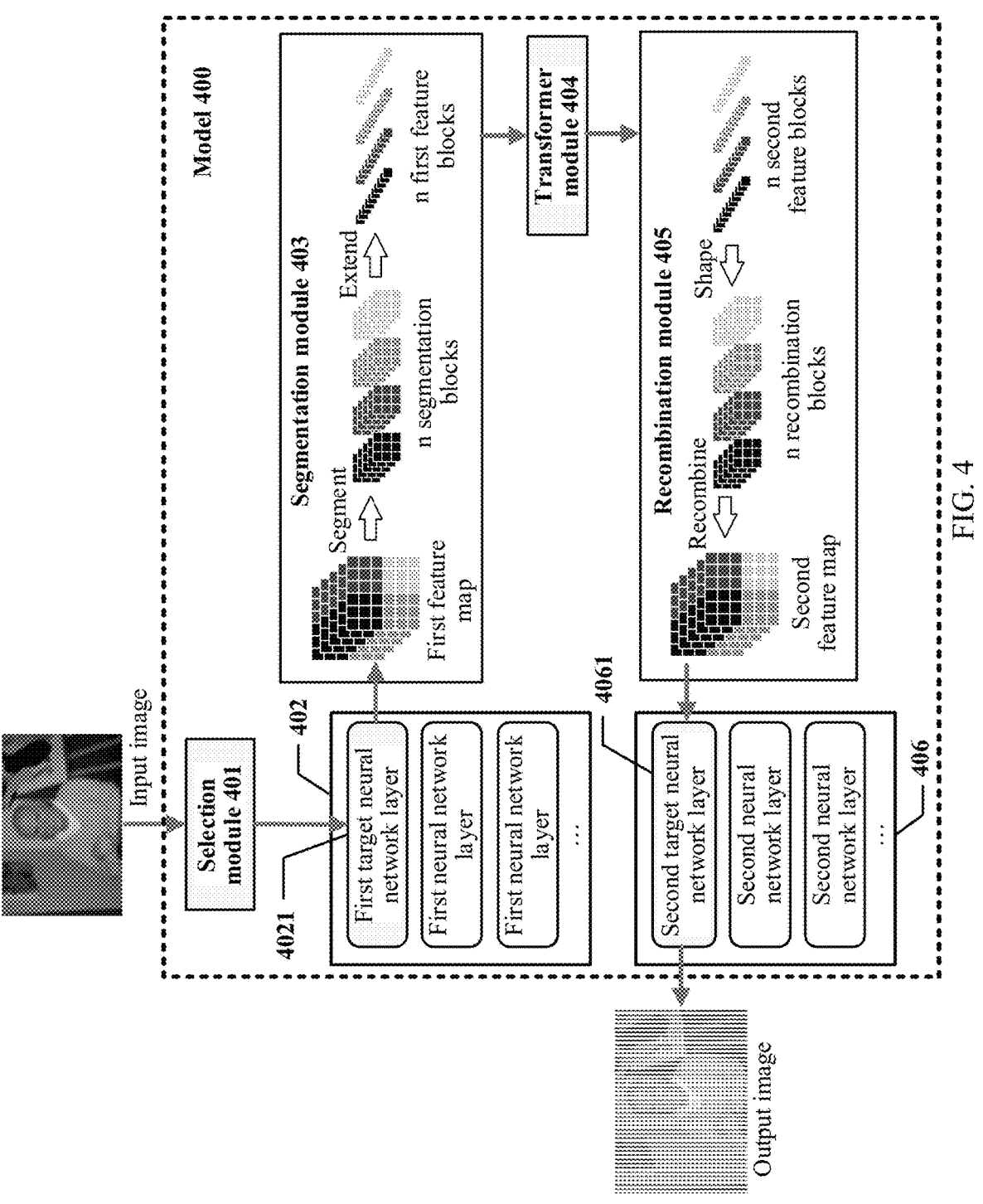
FIG. 4 is a schematic diagram of a model structure according to an embodiment of this application.

FIG. 4 is a schematic diagram of a model structure according to an embodiment of this application. A model 400 may specifically include a selection module 401, m first neural network layers 402, a segmentation module 403, a transformer module 404, a recombination module 405, and m second neural network layers 406. Each first neural network layer uniquely corresponds to one second neural network layer. Each first neural network layer may also be referred to as a head module or a head structure, and each second neural network layer may also be referred to as a tail module or a tail structure.

It should be noted that, in this embodiment of this application, different first neural network layers correspond to different image enhancement tasks. To be specific, each image enhancement task corresponds to one first neural network layer. One first neural network layer processes a corresponding input image for a specific type of an image enhancement task. For example, a 2× super-resolution reconstruction task, a 3× super-resolution reconstruction task, a denoising task, and the like each correspond to one first neural network layer.

It should be further noted that a size, a depth, a parameter quantity, and the like of each first neural network layer may be automatically set, provided that the first neural network layer can run. In addition, a quantity m of first neural network layers may also be set according to a user requirement, and depends on a specific type of image enhancement task processed by the model 400. For example, it is assumed that, it is expected that the model 400 may be simultaneously used to process three types of image enhancement tasks: denoising, deraining, and 2× super-resolution reconstruction. In this case, m=3, and the three types of image enhancement tasks each correspond to one first neural network layer and one second neural network layer. It is assumed that, it is expected that the model 400 may be simultaneously used to process five types of image enhancement tasks: denoising, deblurring, deraining, 2× super-resolution reconstruction, and 4× super-resolution reconstruction. In this case, m=5, and the five types of image enhancement tasks each correspond to one first neural network layer and one second neural network layer. Similarly, the quantity m may be set according to an actual use requirement of a user. Details are not described herein again.

The selection module 401 of the model 400 is configured to: obtain an input image, and determine a first target neural network layer 4021 corresponding to the input image. The first target neural network layer 4021 is one of the m first neural network layers 402 of the model 400. In other words, after receiving the input image, the selection module 401 determines a specific first neural network layer that needs to perform a feature extraction operation on the input image. Specifically, the selection module 401 first determines a specific type of an image enhancement task to which the input image belongs, and then inputs the input image into the first neural network layer corresponding to the task. The image enhancement task to which the input image belongs may be referred to as a first image enhancement task. If it is assumed that the first image enhancement task corresponds to the first target neural network layer 4021, the selection module 401 may determine to input the received input image into the first target neural network layer 4021.

It should be noted that, in some implementations of this application, because input images are different in a training phase and an inference phase, for input images in different phases, manners in which the selection module 401 determines a specific type of image enhancement task to which the input image belongs are slightly different. The following separately describes the manners.

a. In the training phase, the input image is a training sample in a training set.

In some implementations of this application, when the model 400 is in the training phase of the model, the input image is the training sample in the training set. In this case, for each training sample, a corresponding label indicates a specific type of an image enhancement task to which the training sample belongs, and the label indicates a specific first neural network layer that needs to extract a feature of the training sample. In this case, the selection module 401 of the model 400 may determine, based on the label of the training sample, that the training sample belongs to the first image enhancement task.

b. In the inference phase, the input image is a to-be-processed target image.

In some implementations of this application, when the model 400 is in the inference phase of the model, the input image is a real to-be-processed target image. In this process, in addition to receiving the input image, the selection module 401 receives an instruction sent by a device on which the model 400 is deployed. The instruction indicates a specific type of an image enhancement task to which the target image belongs. To be specific, in the inference phase, the selection module 401 of the model 400 determines, based on the received instruction, that the target image belongs to the first image enhancement task.

After determining, based on the input image, the first target neural network layer 4021 corresponding to the input image, the selection module 401 of the model 400 inputs the input image into the first target neural network layer 4021. The first target neural network layer 4021 performs feature extraction on the input image, to obtain a feature map (which may be referred to as a first feature map). The obtained first feature map is further input into the segmentation module 403, and the segmentation module 403 segments the first feature map, to obtain n feature blocks (which may be referred to as first feature blocks). Herein, n≥2.

It should be noted that, in some implementations of this application, a process in which the segmentation module 403 segments the first feature map may be specifically as follows: First, the first feature map is segmented to obtain n segmentation blocks, and then each of the n segmentation blocks is extended to obtain a feature block (namely, the first feature block) represented by a one-dimensional vector. In this way, the n first feature blocks may be obtained.

It should be further noted that, in some implementations of this application, the segmentation module 403 segments the first feature map, and sizes of the obtained n segmentation blocks may be the same, or may be different. This is not specifically limited herein. When the sizes of the obtained n segmentation blocks are the same, the transformer module may subsequently process the n segmentation blocks by using one self-attention module, to reduce a computation amount. When the sizes of the obtained n segmentation blocks are different, the transformer module subsequently needs to process the n segmentation blocks by using a plurality of self-attention modules. A quantity of different sizes (for example, x different sizes) needs to be the same as a quantity of at least x corresponding self-attention modules that need to be configured in the transformer module. However, when there are different segmentation sizes, an advantage is as follows: for a region (for example, a bird flying in the sky) for which more detail features are required, the segmentation module may obtain more small-size segmentation blocks through segmentation; and for a region (for example, the sky) for which a large quantity of detail features are not required, the segmentation module may obtain a small quantity of large-size segmentation blocks through segmentation. In this way, operations are flexible.

After obtaining the n first feature blocks, the segmentation module 403 further inputs the n first feature blocks into the transformer module 404 for processing.

The transformer module 404 generates related information based on the n first feature blocks. The related information indicates a correlation between any two of the n first feature blocks. Then, the transformer module 404 generates, based on the related information, n second feature blocks in a one-to-one correspondence with the n first feature blocks. In other words, each first feature block not only has feature information of the first feature block, but also integrates feature information of another first feature block based on a correlation with the another first feature block. It should be noted herein that a dimension of the n first feature blocks input into the transformer module 404 is the same as a dimension of the n second feature blocks output by the transformer module 404.

It should be noted that, in some implementations of this application, for example, the transformer module 404 includes at least one encoder and at least one decoder. How the transformer module 404 generates the n second feature blocks in a one-to-one correspondence with the n first feature blocks based on the related information is described as follows: First, the encoder generates first related information, and generates, based on the first related information, n third feature blocks in a one-to-one correspondence with the n first feature blocks. The first related information indicates a first correlation between any two of the n first feature blocks, and a dimension of the n first feature blocks input into the encoder is the same as a dimension of the n third feature blocks. Then, the decoder generates second related information, and generates, based on the second related information, the n second feature blocks in a one-to-one correspondence with the n third feature blocks. The second related information indicates a second correlation between any two of the n third feature blocks, and a dimension of the n third feature blocks input into the decoder is the same as a dimension of the n second feature blocks.

It should be noted herein that the second related information is fused with a first task code, and the first task code is used as an input into the decoder. The first task code is a corresponding identifier of the first image enhancement task, or may be considered as a corresponding identifier of the first target neural network layer. Each image enhancement task corresponds to one task code. Because an input image corresponding to each image enhancement task is input into a corresponding first neural network layer, based on the task code, both a specific image enhancement task of an input image from which the n first feature blocks received by the transformer module 404 come and a specific first neural network layer that performs a feature extraction operation to obtain the n first feature blocks may be learned of.

It should be further noted that, in some implementations of this application, the first task code may be sent by the encoder to the decoder, and then the first task code is used as an input into the decoder. Alternatively, when the first target neural network layer is triggered to receive the input image, the first task code is received based on an instruction sent by a device on which the model 400 is deployed, and then the first task code is used as an input into the decoder. Specifically, a manner of obtaining the first task code is not limited in this application. In addition, it should be further noted that each task code may be marked automatically based on an image enhancement task, or may be obtained by the model through self-learning. This is not specifically limited herein.

After the transformer module 404 obtains the n second feature blocks based on the n first feature blocks and the related information, the recombination module 405 splices and recombines the n second feature blocks based on a relative spatial location, to obtain a second feature map whose dimension is same as that of the input first feature map. An operation of the recombination module 405 is an inverse operation of the segmentation module 403. Details are not described herein again. It should be noted herein that a size of the second feature map needs to be the same as a size of the first feature map.

The recombination module 405 splices and recombines the n second feature blocks, to obtain the second feature map, and inputs the second feature map into a second target neural network layer 4061 uniquely corresponding to the first target neural network layer 4021. The second target neural network layer 4061 is one of the m second neural network layers 406. Then, the second target neural network layer 4061 decodes the received second feature map to obtain an output image. The output image is an enhanced image that is of the input image and that is obtained after the model 400 performs processing.

It should be noted that, similar to the first neural network layer, a size, a depth, a parameter quantity, and the like of each second neural network layer may also be automatically set, provided that the second neural network layer can run. In addition, a quantity m of second neural network layers needs to be the same as the quantity of first neural network layers.

It should be further noted that, in some implementations of this application, a structure of the transformer module 404 may be a standard structure that includes an encoder and a decoder and that is shown in FIG. 2, or may be slightly adjusted to obtain an adjusted structure of the transformer module 404. For example, the adjusted structure of the transformer module 404 may include only an encoder, or may include only a decoder. If the structure of the transformer module 404 includes only an encoder, the transformer module 404 needs to include at least two encoders, and at least one encoder is configured to perform an operation originally performed by a decoder. If the structure of the transformer module 404 includes only a decoder, the transformer module 404 needs to include at least two decoders, and at least one decoder is configured to perform an operation originally performed by an encoder.

Figure 5:
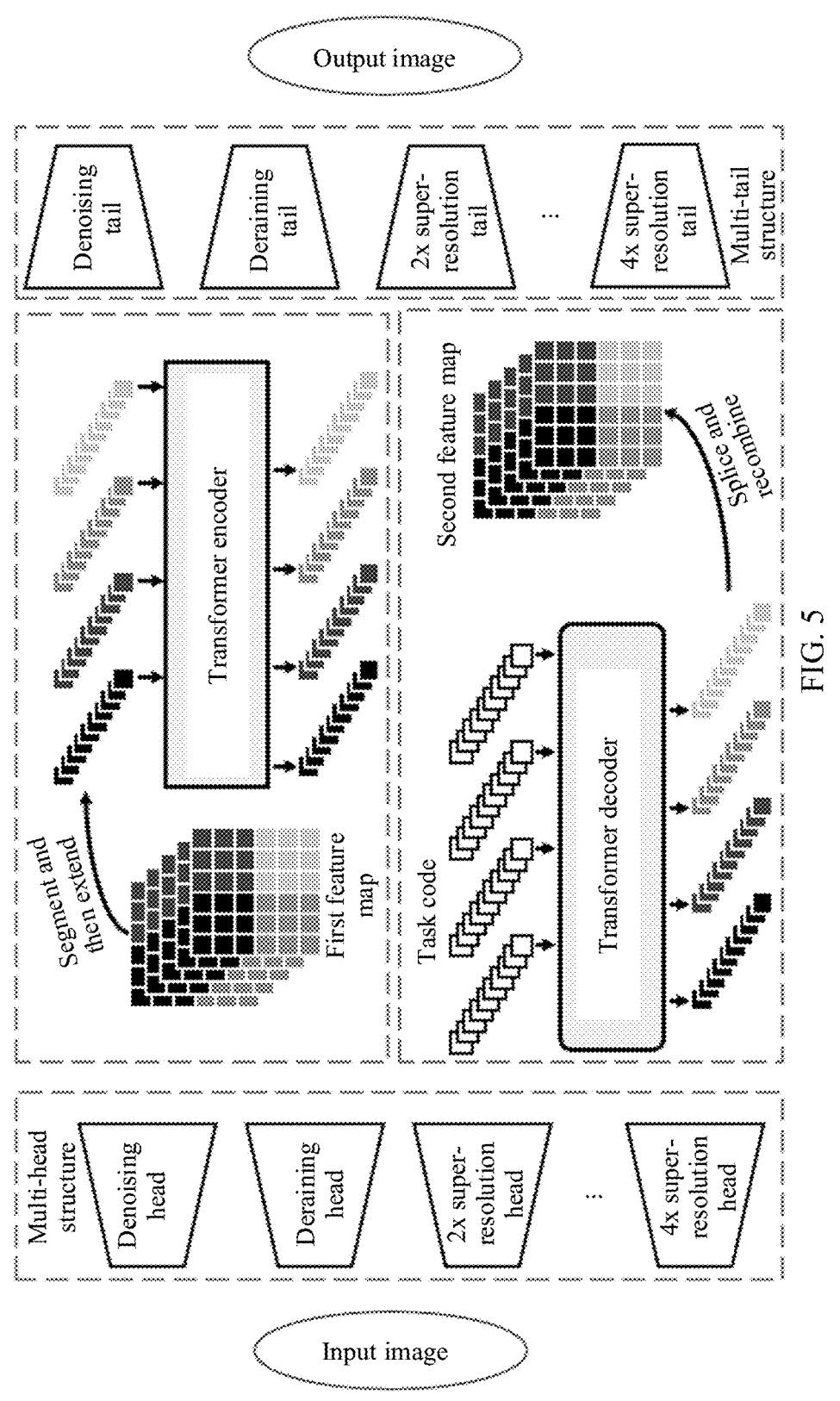
FIG. 5 is a schematic diagram in which a model is configured to perform image enhancement processing on an input image according to an embodiment of this application.

It should be noted that in this embodiment of this application, the m first neural network layers 402 and the m second neural network layers 406 are respectively located at a head and a tail of the model. Therefore, in some implementations of this application, the m first neural network layers 402 may also be briefly referred to as a multi-head structure, the m second neural network layers 406 may also be briefly referred to as a multi-tail structure, and each first neural network layer may be referred to as an "XX head" based on an image enhancement task corresponding to the first neural network layer. As shown in FIG. 5, the model includes four first neural network layers, and image enhancement tasks respectively corresponding to the four first neural network layers are respectively denoising, deraining, 2× super-resolution reconstruction, and 4× super-resolution reconstruction. In this case, the four first neural network layers may be respectively briefly referred to as a "denoising head", a "deraining head", a "2× super-resolution head", and a "4× super-resolution head". Similarly, the four first neural network layers each also uniquely correspond to one second neural network layer. There are a total of four second neural network layers. The four second neural network layers may also be respectively briefly referred to as a "denoising tail", a "deraining tail", a "2× super-resolution tail", and a "4× super-resolution tail". Similarly, if there is another image enhancement task, a brief name of a corresponding first neural network layer may be obtained in the foregoing manner. Details are not described herein.

To help understand a working procedure of the model 400, a specific process in which the model 400 processes the input image is described below by using an example in which the transformer model is of the standard structure in FIG. 2. FIG. 5 is a schematic diagram in which a model 400 is configured to perform image enhancement processing on an input image according to an embodiment of this application.

To adapt to different image enhancement tasks, in this application, a multi-head structure is used to separately process each task, and each task corresponds to a head module. It is assumed that an initial input image of the model is $x \in \mathbb{R}^{C \times H \times W}$ is a quantity of channels of the input image. For example, when a greyscale image is input, C=1; and when a color image is input, C may be 3, and indicates RGB. H×W is a size (that is, a height and a width) of the initial input image x. The initial input image x is input into a target head structure (it is assumed that the initial input image x is input into the denoising head) in the multi-head structure based on a graphics enhancement task to which the initial input image belongs. The target head structure generates a feature map $f_H \in \mathbb{R}^{C \times H \times W}$ (that is, the first feature map) that has C channels and whose size is the same as the size of the initial input image x. The feature map $f_H \in \mathbb{R}^{C \times H \times W}$ may be represented as $f_H = H^i(x)$. $H^i$ (i={1, . . . , $N_t$}) represents a head structure corresponding to an image enhancement task, and $N_t$ represents a quantity of types of image enhancement tasks (that is, a specific quantity of types of image enhancement tasks).

Then, the segmentation module (not shown in FIG. 5) segments the feature map $f_H \in \mathbb{R}^{C \times H \times W}$. Each feature block may be considered as a code of a "word". Specifically, the feature map $f_H \in \mathbb{R}^{C \times H \times W}$ is segmented and shaped into a series of feature blocks $$f_{p_i} \in \mathbb{R}^{P^2 \times C}, i = \{1, \ldots, N\}. \ N = \frac{HW}{P^2}.$$

N represents a quantity of blocks (that is, a length of an input sequence). It should be noted herein that a maximum value of N is determined based on a specific structure of the transformer model, and a quantity of feature blocks $f_{p_i}$ obtained by the segmentation module through segmentation cannot exceed the maximum value of N. In addition, a size of the feature block $f_{p_i}$ may also be determined by presetting a value of P. In this embodiment of this application, sizes of all feature blocks $f_{p_i}$ are the same. Actually, in some implementations of this application, the sizes of the feature blocks $f_{p_i}$ may alternatively be different. This is not specifically limited herein. In addition, to maintain location information of each feature block, in this application, learnable positional encoding $E_{p_i} \in \mathbb{R}^{p^2 \times C}$ is added for each feature block $f_{p_i}$ (in some implementations, positional encoding may alternatively be set automatically), each feature block $f_{p_i}$ and positional encoding of a corresponding location are added to obtain $E_{p_i} + f_{p_i}$, and then each value $E_{p_i} + f_{p_i}$ is input into a transformer encoder.

Figure 6:
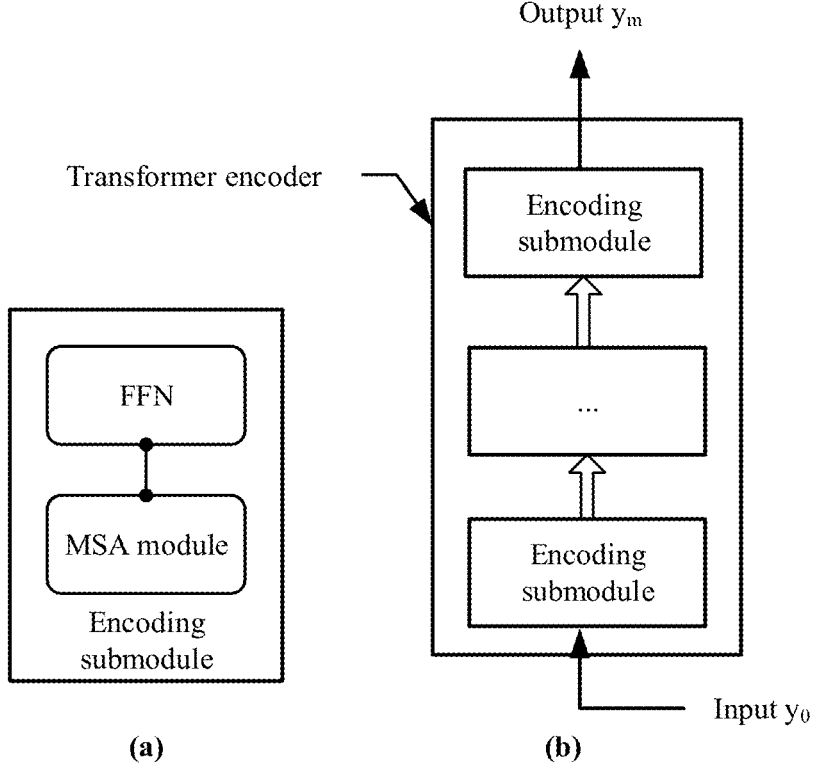
FIG. 6 is a schematic diagram of a transformer encoder according to an embodiment of this application.

In this embodiment of this application, a structure of the transformer encoder in the transformer module may be shown in FIG. 6. A schematic subdiagram (a) in FIG. 6 shows an encoding submodule in the transformer encoder. The encoding submodule includes one multi-head self-attention module (which may be denoted as an MSA module) and one feedforward neural network (which may be denoted as an FFN). The transformer encoder may include a plurality of such encoding submodules (a quantity may be automatically set based on a requirement). A schematic subdiagram (b) in FIG. 6 shows that one transformer encoder includes a plurality of encoding submodules.

The following describes a processing procedure of the transformer encoder based on each encoding submodule in the transformer encoder shown in FIG. 6.

An input of a first encoding submodule of the transformer encoder may be represented in a form in Formula (1):

$$y_0 = [E_{P1} + f_{P1}, E_{P2} + f_{P2}, E_{PN} + f_{PN}] \tag{1}$$

Herein, $y_0$ represents the input of the first encoding submodule, $f_{p_i} \in \mathbb{R}^{p^2 \times C}$, ={1, . . . , N} is the feature block obtained after the segmentation module performs segmentation, and $E_{p_i} \in \mathbb{R}^{p^2 \times C}$ is positional encoding corresponding to the feature block $f_{p_i}$. An output $f_{E_i} \in \mathbb{R}^{p^2 \times C}$ obtained after the encoding submodule processes each feature block $f_{p_i}$ is the same as the size of the input feature block $f_{p_i}$. A computing formula (2) of one encoding submodule is as follows:

$$q_i = k_i = v_i = LN(y_{i-1}) \tag{2}$$

LN represents layer normalization (a normalization operation), and $y_{i-1}$ is an input of a current encoding submodule. For the first encoding submodule, an input of the first encoding submodule is $y_0$. For a subsequent encoding submodule, an input of an $i^{th}$ encoding submodule is an output $y_{i-1}$ of an $(i-1)^{th}$ encoding submodule. Herein, $q_i$, $k_i$, and $v_i$ are three vectors into which the input is converted, are used as an input of an MSA module (that is, a multi-head self-attention module) in the current encoding submodule. An output of the MSA module of the current encoding submodule is shown in Formula (3):

$$y'_i = MSA(q_i, k_i, v_i) + y_{i-1} \tag{3}$$

Herein, $y'_i$ is the output of the MSA module in the current encoding submodule, and $y'_i$ is subsequently used as an input part of an FFN (that is, a feedforward neural network) of the current encoding submodule, as shown in Formula (4):

$$y_i = FFN(LN(y'_i)) + y'_i, \text{ where } i = 1, \ldots, m \tag{4}$$

Herein, $y_i$ is an output of the $i^{th}$ encoding submodule. In the foregoing formula, m represents a quantity of layers in the transformer encoder (that is, there are a total of m encoding submodules). An output of a last encoding submodule of the transformer encoder is $y_m$ (denoted as $z_0$ in the decoder), as shown in Formula (5):

$$y_m = [f_{E_1}, f_{E_2}, \ldots, f_{E_N}] = z_0 \tag{5}$$

Figure 7:
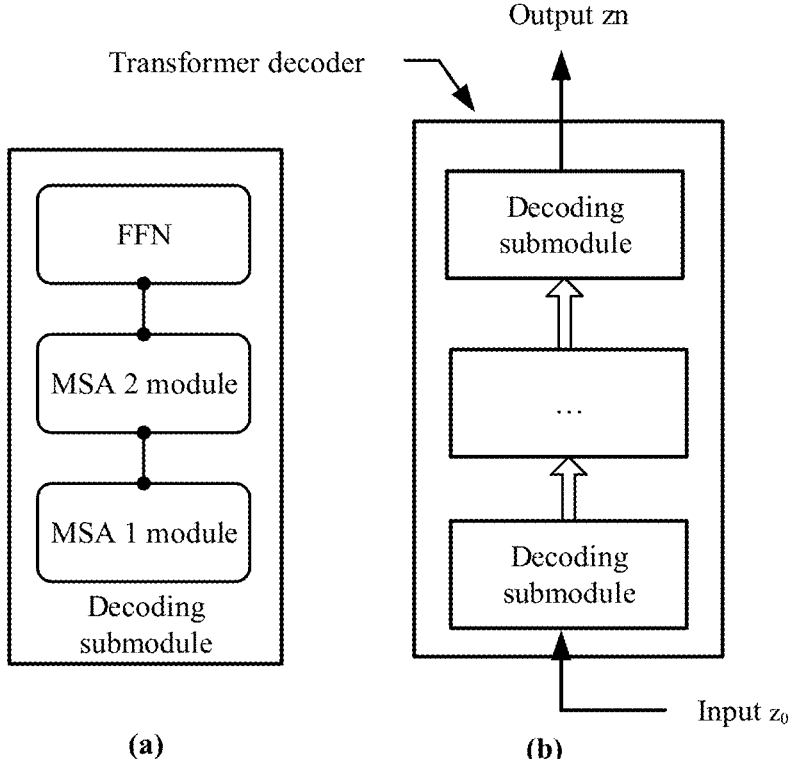
FIG. 7 is a schematic diagram of a transformer decoder according to an embodiment of this application.

Similarly, in this embodiment of this application, a structure of the transformer decoder in the transformer module may be shown in FIG. 7. The transformer decoder and the transformer encoder have similar systems. A schematic subdiagram (a) in FIG. 7 shows one decoding submodule in the transformer decoder. The decoding submodule includes two multi-head self-attention modules (which may be respectively denoted as an MSA 1 module and an MSA 2 module) and one feedforward neural network (which may be denoted as an FFN). The transformer decoder may include a plurality of such decoding submodules (a quantity may be automatically set based on a requirement). A schematic subdiagram (b) in FIG. 7 shows that one transformer decoder includes a plurality of decoding submodules.

The following describes a processing procedure of the transformer decoder based on each decoding submodule in the transformer decoder shown in FIG. 7.

In this embodiment of this application, different from a case in which the transformer module is configured to process a natural language task, in this application, a task code of a specific image enhancement task is used as an input of the transformer decoder. The task code $E_t^i \in \mathbb{R}^{p^2 \times c} = \{1, \ldots, N_t\}$ can be used to encode features of different image enhancement tasks. It should be noted that the task code may be preset, or may be obtained through learning. This is not specifically limited herein. An input of a first decoding submodule of the transformer decoder is the output $y_m$, of the last encoding submodule of the transformer encoder, and may be represented in a form in Formula (6):

$$z_0 = [f_{E_1}, f_{E_2}, \ldots, f_{E_N}] \quad (6)$$

For the MSA 1 module of the decoding submodule, three variables $q_i$, $k_i$, $v_i$ input into the MSA 1 module may be shown in Formula (7):

$$q_i = k_i = LN(z_{i-1}) + E_t, \text{ where } v_i = LN(z_{i-1}) \quad (7)$$

Herein, $E_t$ is a task code, is used to compute vectors $q_i$ and $k_i$, and is unrelated to and $z_{i-1}$ is an input of a current decoding submodule. For the first decoding submodule, an input of the first decoding submodule is $z_0$. For a subsequent decoding submodule, an input of an $i^{th}$ decoding submodule is an output $z_{i-1}$ of an $(i-1)^{th}$ decoding submodule. Then, the three vectors $q_i$, $k_i$, and $v_i$ are sent to the MSA 1 module of the decoding submodule, and an output $z'_i$ of the MSA 1 module is obtained based on Formula (8):

$$z'_i = MSA(q_i, k_i, v_i) + z_{i-1} \quad (8)$$

For the first decoding submodule, the input of the first decoding submodule is an output $z_0$ of an encoding module. For the ($i \geq 2$) decoding submodule, the input of the $i^{th}$ decoding submodule is an output $z_{i-1}$ of an upper-layer decoding submodule (the $(i-1)^{th}$ decoding submodule). For the MSA 2 module of the decoding submodule, a computing manner of three vectors $q'_i$, $v'_i$, and $v'_i$ input into the MSA 2 module may be shown in Formula (9):

$$q'_i = LN(z'_i) + E_p, k'_i = v'_i = LN(z_0) \quad (9)$$

The vector $q'_i$ is computed based on the output $z'_i$ of the MSA 1 module, and the vectors $k'_i$ and $v'_i$ are computed based on the output $z_0$ of the transformer encoder. In this way, the input $q'_i$, $k'_i$, and $v'_i$ of the MSA 2 module is obtained. Therefore, the output $z''_i$ of the MSA 2 module may be computed based on Formula (10):

$$z''_i = MSA(q'_i, k'_i, v'_i) + z'_i \quad (10)$$

Then, the output $z''_i$ of the MSA 2 module is used as an input of the FFN, and the output $z_i$ of the $i^{th}$ decoding submodule is obtained based on Formula (11):

$$z_i = FFN(LN(z''_i)) + z''_i, \text{ where } i = 1, \ldots, n \quad (11)$$

For a transformer decoder including a total of n decoding submodules, a final output $z_n$ of the transformer decoder may be denoted in an expression form in Formula (12):

$$z_n = [f_{D_1}, f_{D_2}, \ldots, f_{D_N}] \quad (12)$$

Herein, $f_{p_i} \in \mathbb{R}^{p^2 \times c}$ represents an output of each feature block in the decoder. Then, the N decoded feature blocks whose sizes are $P^2 \times C$ are reshaped, by using the recombination module, into a feature map $f_D$ (that is, the second feature map) whose size is $C \times H \times W$. Finally, the recombination module inputs the feature map $f_D$ into a tail structure corresponding to a head structure that processes the input image. For example, assuming that the "denoising head" performs feature extraction on the input image, the feature map $f_D$ is input into the "denoising tail", and the tail structure decodes the feature map $f_D$ to obtain an output image, the output image is an enhanced image of the input image after the model performs processing. A computing formula (13) of the tail structure is shown as follows:

$$f_T = T^i(f_D) \quad (13)$$

Herein, $T^i(i = \{1, \ldots, N_t\})$ represents a tail structure of the $i^{th}$ image enhancement task, and $N_t$ represents a quantity of types of image enhancement tasks. An output $f_T$ is a result image whose size is $3 \times H' \times W'$. H' and W' are sizes of the output image, and are determined based on a specific image enhancement task. For example, for the 2× super-resolution reconstruction task, H'=2H and W=2 W.

In the foregoing embodiments of this application, a transformer module configured to process a natural language task is combined with a different neural network structure to obtain a new model structure, to overcome a limitation that the transformer module can only be used to process the natural language task. The model structure may be applied to a low-level vision task. The model structure includes a plurality of first neural network layers and a plurality of second neural network layers, and different first/second neural network layers correspond to different image enhancement tasks. Therefore, after being trained, a model can be used to process different image enhancement tasks. In addition, compared with a manner in which most existing models that process the low-level vision task are based on a CNN (as a good feature extractor, the CNN plays an important role in a high-level vision task, but can hardly pay attention to global information when processing the low-level vision task), in this application, the model may pay attention to the global information by using the transformer module, to improve an image enhancement effect.

2. A model structure includes one first neural network layer and one second neural network layer.

Figure 8:
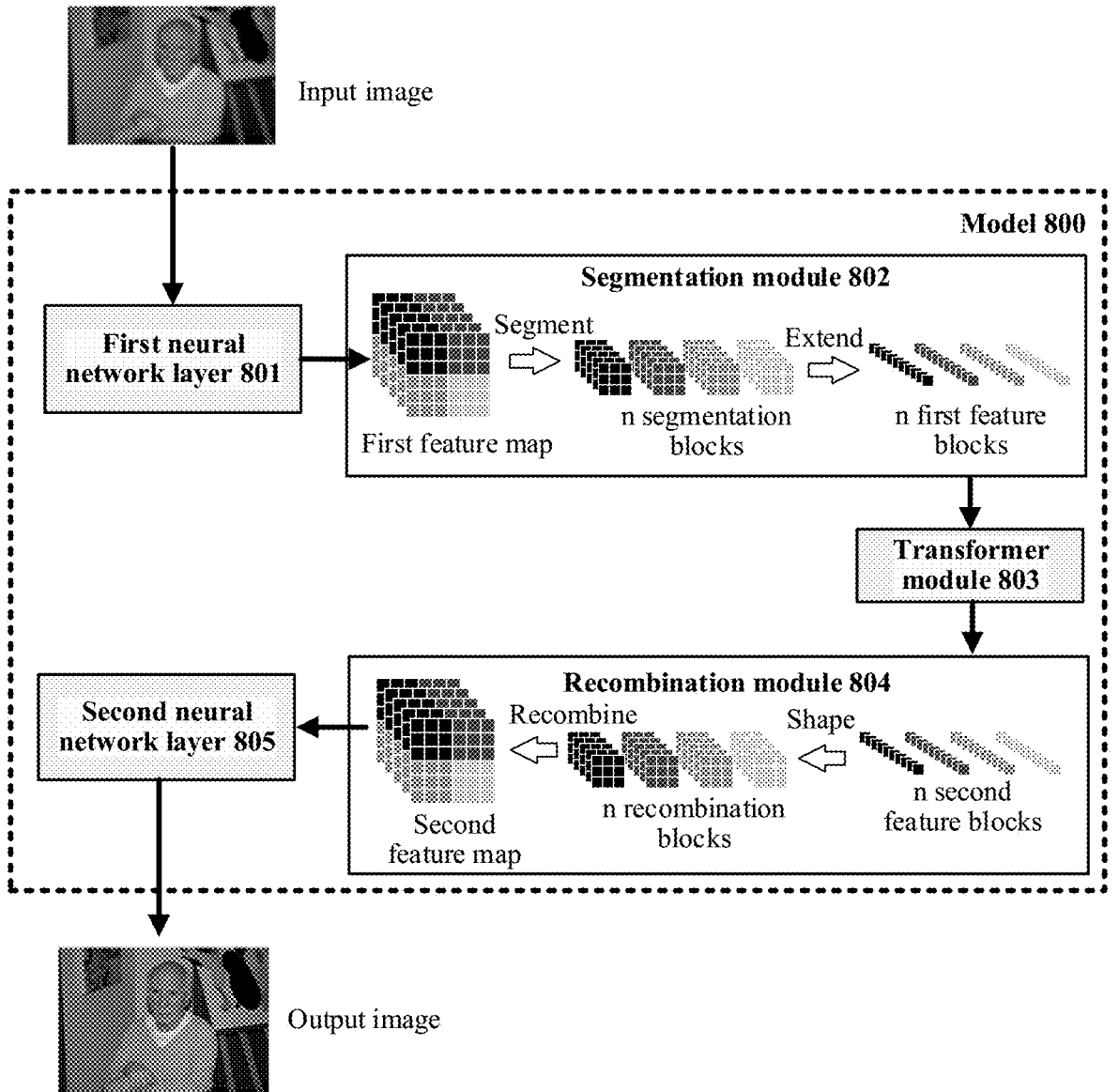
FIG. 8 is another schematic diagram of a model structure according to an embodiment of this application.

FIG. 8 is another schematic diagram of a model structure according to an embodiment of this application. A model 800 may specifically include a first neural network layer 801, a segmentation module 802, a transformer module 803, a recombination module 804, and a second neural network layer 805. The first neural network layer 801 may also be referred to as a head module or a head structure, and the second neural network layer 805 may also be referred to as a tail module or a tail structure. In this embodiment of this application, because there is only one first neural network layer 801 and one second neural network layer 805, there is no selection module in the model 800.

It should be noted that, in this embodiment of this application, the first neural network layer 801 correspond to only one type of image enhancement task, and the first neural network layer 801 processes a corresponding input image for a specific type of an image enhancement task.

It should be further noted that, a size, a depth, a parameter quantity, and the like of the first neural network layer 801 and the second neural network layer 805 may be automatically set, provided that the first neural network layer 801 and the second neural network layer 805 can run.

In this embodiment of this application, the first neural network layer 801 is configured to perform feature extraction on the input image, to obtain a feature map (which may be referred to as a first feature map). Then, the first feature map is input into the segmentation module 802. The segmentation module 802 is configured to segment the first feature map, to obtain n feature blocks (which may be referred to as a first feature block). Herein, n≥2. Similarly, in the model 800, a process in which the segmentation module 802 segments the first feature map may be specifically as follows: First, the first feature map is segmented to obtain n segmentation blocks, and then each of the n segmentation blocks is extended to obtain a feature block (that is, the first feature block) represented by a one-dimensional vector. In this way, the n first feature blocks may be obtained.

It should be further noted that, in some implementations of this application, the segmentation module 802 segments the first feature map, and sizes of the obtained n segmentation blocks may be the same, or may be different. This is not specifically limited herein. When the sizes of the obtained n segmentation blocks are the same, the transformer module may subsequently process the n segmentation blocks by using one self-attention module, to reduce a computation amount. When the sizes of the obtained n segmentation blocks are different, the transformer module subsequently needs to process the n segmentation blocks by using a plurality of self-attention modules. A quantity of different sizes (for example, x different sizes) needs to be the same as a quantity of at least x corresponding self-attention modules that need to be configured in the transformer module. However, when there are different segmentation sizes, an advantage is as follows: for a region (for example, a bird flying in the sky) for which more detail features are required, the segmentation module may obtain more small-size segmentation blocks through segmentation, and for a region (for example, the sky) for which a large quantity of detail features are not required, the segmentation module may obtain a small quantity of large-size segmentation blocks through segmentation. In this way, operations are flexible.

After obtaining the n first feature blocks, the segmentation module 802 further inputs the n first feature blocks into the transformer module 803 for processing.

The transformer module 803 generates related information based on the n first feature blocks. The related information indicates a correlation between any two of the n first feature blocks. Then, the transformer module 803 generates, based on the related information, n second feature blocks in a one-to-one correspondence with the n first feature blocks. In other words, each first feature block not only has feature information of the first feature block, but also integrates feature information of another first feature block based on a correlation with the another first feature block. It should be noted herein that a dimension of the n first feature blocks input into the transformer module 803 is the same as a dimension of the n second feature blocks output by the transformer module 803.

It should be noted that, in some implementations of this application, for example, the transformer module 803 includes at least one encoder and at least one decoder. How the transformer module 803 generates the n second feature blocks in a one-to-one correspondence with the n first feature blocks based on the related information is described as follows: First, the encoder generates first related information, and generates, based on the first related information, n third feature blocks in a one-to-one correspondence with the n first feature blocks. The first related information indicates a first correlation between any two of the n first feature blocks, and a dimension of the n first feature blocks input into the encoder is the same as a dimension of the n third feature blocks. Then, the decoder generates second related information, and generates, based on the second related information, the n second feature blocks in a one-to-one correspondence with the n third feature blocks. The second related information indicates a second correlation between any two of the n third feature blocks, and a dimension of the n third feature blocks input into the decoder is the same as a dimension of the n second feature blocks.

It should be noted herein that the second related information is fused with a first task code, and the first task code is used as an input into the decoder. The first task code is a corresponding identifier of an image enhancement task to which the input image belongs. Based on the task code, a specific image enhancement task of an input image from which the n first feature blocks received by the transformer module 803 come may be learned of.

It should be further noted that, in some implementations of this application, the first task code may be sent by the encoder to the decoder, and then the first task code is used as an input into the decoder. Alternatively, when the first target neural network layer is triggered to receive the input image, the first task code is received based on an instruction sent by a device on which the model 800 is deployed, and then the first task code is used as an input into the decoder. Specifically, a manner of obtaining the first task code is not limited in this application. In addition, it should be further noted that each task code may be marked automatically based on an image enhancement task, or may be obtained by the model through self-learning. This is not specifically limited herein.

After the transformer module 803 obtains the n second feature blocks based on the n first feature blocks and the related information, the recombination module 804 splices and recombines the n second feature blocks based on a relative spatial location, to obtain a second feature map whose dimension is same as that of the input first feature map. An operation of the recombination module 804 is an inverse operation of the segmentation module 802. Details are not described herein again. It should be noted herein that a size of the second feature map needs to be the same as a size of the first feature map.

The recombination module 804 splices and recombines the n second feature blocks to obtain a second feature map, and inputs the second feature map into the second neural network layer 805. The second neural network layer 805 decodes the received second feature map to obtain an output image. The output image is an enhanced image that is of the input image and that is obtained after the model 800 performs processing.

It should be noted that, in this embodiment of this application, in a training phase of the model 800, the input image is a training sample in a training set; and in an inference phase of the model 800, the input image is a real to-be-processed target image.

It should be further noted that, in this embodiment of this application, the model 800 does not include the selection module 401 of the model 400, and a difference lies in that there is only one first neural network layer and one second neural network layer of the model 800. A processing process of each module in the model 800 is similar to that of the model 400. For details, refer to a corresponding implementation in which the model 400 performs image enhancement processing on the input image in FIG. 4. Details are not described herein again.

In the foregoing embodiments of this application, a transformer module configured to process a natural language task is combined with a different neural network structure to obtain a new model structure, to overcome a limitation that the transformer module can only be used to process the natural language task. The model structure may be applied to a low-level vision task. The model structure includes one first neural network layer and one second neural network layer, and is used to process a specific image enhancement task. Compared with a manner in which most existing models that process the low-level vision task are based on a CNN (as a good feature extractor, the CNN plays an important role in a high-level vision task, but can hardly pay attention to global information when processing the low-level vision task), in this application, the model may pay attention to the global information by using the transformer module, to improve an image enhancement effect.

Figure 9:
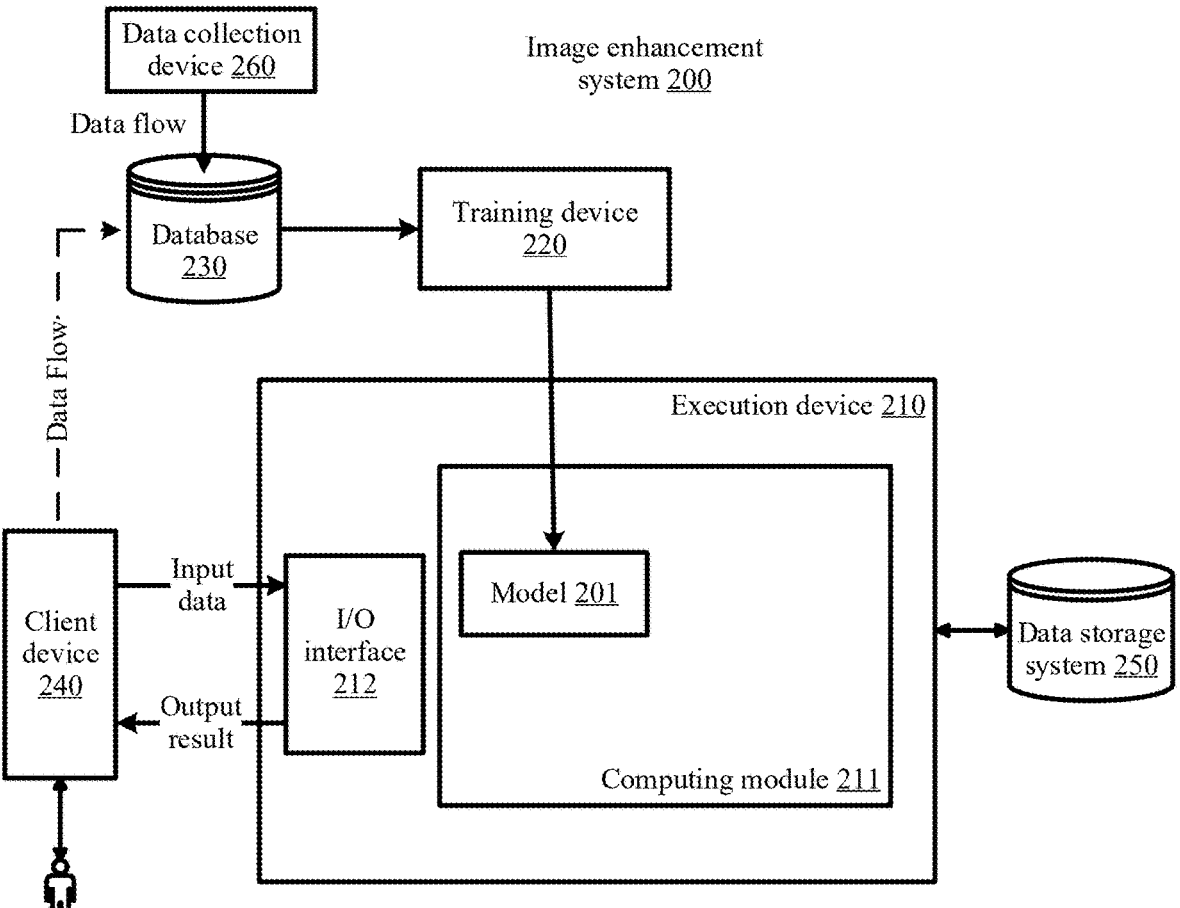
FIG. 9 is a diagram of a system architecture of an image enhancement system according to an embodiment of this application.

It should be noted that the model 400 corresponding to FIG. 4 and the model 800 corresponding to FIG. 8 need to be trained first. Only after being trained, the model 400 and the model 800 can be deployed on a target device to execute an image enhancement task for a target image. The following describes an architecture of an image enhancement system. FIG. 9 is a diagram of a system architecture of an image enhancement system according to an embodiment of this application. In FIG. 9, an image enhancement system 200 includes an execution device 210, a training device 220, a database 230, a client device 240, a data storage system 250, and a data collection device 260. The execution device 210 includes a computing module 211. The data collection device 260 is configured to: obtain an open-source large-scale dataset (that is, a training set) required by a user, and store the training set in the database 230. The training device 220 trains, based on the training set maintained in the database 230, a model 201 provided in this application. The trained model 201 obtained through training is applied to the execution device 210 (the execution device may also be referred to as a target device). The execution device 210 may invoke data, code, and the like in the data storage system 250, and may further store data, an instruction, and the like in the data storage system 250. The data storage system 250 may be disposed in the execution device 210, or the data storage system 250 may be an external memory relative to the execution device 210.

The trained model 201 obtained by the training device 220 through training may be applied to different systems or devices (that is, the execution device 210), and may be specifically an edge device or an end-side device, for example, a mobile phone, a tablet computer, a notebook computer, or a supervision system (for example, a camera). In FIG. 9, an I/O interface 212 is configured in the execution device 210, to exchange data with an external device. The "user" may input data to the I/O interface 212 by using the client device 240. For example, the client device 240 may be a camera device of the surveillance system, and an image photographed by the camera device is used as input data and is input into the computing module 211 of the execution device 210. The computing module 211 performs image enhancement processing on an input image to obtain an enhanced image. The obtained enhanced image may be output to the camera device for display or storage, or the obtained enhanced image may be directly displayed or stored on a display interface (if the display interface exists) of the execution device 210. In addition, in some implementations of this application, the client device 240 may alternatively be integrated into the execution device 210. For example, when the execution device 210 is a mobile phone, a to-be-processed target image (for example, an image photographed by a camera of the mobile phone) may be directly obtained by using the mobile phone, or a target image sent by another device (for example, another mobile phone) may be received, and then the computing module 211 in the mobile phone performs image enhancement on the target image to obtain an enhanced image, and directly presents the enhanced image on a display interface of the mobile phone or stores the enhanced image in the mobile phone. Product forms of the execution device 210 and the client device 240 are not limited herein.

It should be noted that FIG. 9 is merely a schematic diagram of a system architecture according to an embodiment of this application. A location relationship between devices, components, modules, and the like shown in the figure constitutes no limitation. For example, in FIG. 9, the data storage system 250 is an external memory relative to the execution device 210. In another case, the data storage system 250 may alternatively be disposed in the execution device 210. In FIG. 9, the client device 240 is an external device relative to the execution device 210. In another case, the client device 240 may alternatively be integrated into the execution device 210.

It should be noted that, in this embodiment of this application, training of the model 201 may be implemented on a cloud side. For example, a training device 220 (the training device 220 may be disposed on one or more servers or virtual machines) on the cloud side may obtain a training set, train the model 201 based on a plurality of groups of training samples in the training set, to obtain a trained model 201, and then send the trained model 201 to the execution device 210 for application. For example, the model 201 is sent to the execution device 210 for an image enhancement task such as super-resolution image reconstruction, denoising, or deraining. For example, in the system architecture corresponding to FIG. 9, the training device 220 trains the model 201, and then sends the trained model 201 to the execution device 210 for use. Training of the model 201 in the foregoing embodiments may alternatively be implemented on a terminal side. In other words, the training device 220 may be located on the terminal side. For example, a terminal device (for example, a mobile phone or a smartwatch), a wheeled mobile device (for example, a self-driving vehicle or an assisted driving vehicle), or the like obtains a training set, and trains the model 201 based on a plurality of groups of training samples in the training set, to obtain a trained model 201. The trained model 201 may be directly used in the terminal device, or may be sent by the terminal device to another device for use. Specifically, in this embodiment of this application, a specific device (the cloud side or the terminal side) on which the model 201 is trained or applied is not limited.

It should further be noted that in the embodiment corresponding to FIG. 9, a model structure of the model 201 may be a structure of the model 400 corresponding to FIG. 4, or may be a structure of the model 800 corresponding to FIG. 8. This is not specifically limited herein.

The following separately describes, from perspectives of a training phase of a model and an inference phase of the model, specific implementation procedures of a method for training a model and an image enhancement method provided in embodiments of this application.

A. Training Phase

In embodiments of this application, the training phase describes a process in which a training device 220 obtains a trained model 201 by using a training set maintained in a database 230. In embodiments of this application, the model

201 may be of a structure of the model 400 corresponding to FIG. 4, or may be of a structure of the model 800 corresponding to FIG. 8. A method for training a model slightly varies with a model structure. The following separately provides descriptions.

(1) A model structure is a structure corresponding to a model 400.

FIG. 10 is a schematic flowchart of a method for training a model according to an embodiment of this application. The method may specifically include the following operations.

Operation 1001: A training device obtains a training sample, where the training sample is any degraded image in a constructed training set, and each degraded image in the training set is obtained by performing image degradation processing on a clean image.

The training device first obtains the training sample from the constructed training set. The training sample is any degraded image in the constructed training set, and each degraded image is obtained by performing image degradation processing on the clean image. Each clean image may be obtained by a user from an open-source large-scale dataset. For example, the clean image may be obtained from an ImageNet dataset. Because there may be different types of image enhancement tasks, for example, denoising, deraining, and super-resolution reconstruction, different types of training sets may be constructed based on the different image enhancement tasks. In this embodiment of this application, to train the model in a supervised manner, a plurality of types of degraded images may be obtained through synthesis from an unsupervised clean image by using different image degradation models, to obtain training sets corresponding to various different image enhancement tasks. For example, for a super-resolution task, a clean image in an unsupervised dataset is downsampled, to obtain a low-resolution degraded image.

It should be noted that, in this embodiment of this application, constructing the training set through image degradation processing is to obtain a large training set, because there is usually insufficient supervised data during image processing (for example, a DIV2K dataset used for a super-resolution task includes only 2000 images). Therefore, in this application, it is proposed that the model is trained based on the open-source large-scale dataset (for example, the ImageNet dataset) and the unsupervised dataset.

For ease of understanding, the following example is used for illustration. In this application, the ImageNet dataset may be used, and the dataset includes a high-diversity color image that exceeds 1 M. A training image is cropped into 48×48 blocks with three channels for training, and more than 10 million blocks are used to train the model proposed in this application. Then, in this application, damaged images with six degradation types are generated, and are respectively 2×, 3×, and 4× bicubic linear interpolation downsampling images, Gaussian noise at noise levels 30 and 50, and an added rain streak. For a super-resolution reconstruction task, a degradation model separately performs 2×, 3×, and 4× downsampling through $f_{sr}$ bicubic interpolation, to obtain images required for different super-resolution tasks. For denoising, the degradation model is $f_{noise}(I)=I+r$, where r is Gaussian noise. The Gaussian noise at the noise levels 30 and 50 is added to obtain the training sample. For a deraining task, the degradation model is $f_{rain}(I)=I+r$, where r is a deraining streak. That is, the deraining streak is added to a pure image, to obtain a training sample of a deraining task.

It should be noted that, in some implementations of this application, the training sample may alternatively be a real low-quality image with a label. When the low-quality image is used as the training sample, a corresponding high-quality clean image also needs to exist. Specifically, a type of the training sample is not limited herein.

It should be further noted that, in some implementations of this application, the model may be pre-trained by using a degraded image obtained after image degradation processing, and then the model is fine-tuned by using the real low-quality image with a label. Specifically, for each training batch (each batch corresponds to one type of image enhancement task), in this application, one task is randomly selected from $N_t$ image enhancement tasks for training, and each task is pre-trained by using a first target neural network layer, a second target neural network layer, and a first task code that correspond to the task. After the model is pre-trained, a corresponding dataset of the task may be used to fine-tune the model, to apply the model to a specific task. In a fine-tuning phase, parameters of a corresponding first target neural network layer, second target neural network layer, and a shared structure in the model are updated, and a first target neural network layer and a second target neural network layer that correspond to another task are frozen.

Operation 1002: The training device inputs the training sample into the model, so that a selection module of the model determines a first target neural network layer corresponding to the training sample, where the first target neural network layer is one of m first neural network layers of the model.

After obtaining the training sample, the training device inputs the training sample into the model, and the selection module of the model determines the first target neural network layer corresponding to the training sample. Because for each training sample, a corresponding label indicates a specific type of an image enhancement task to which the training sample belongs, the label indicates a specific first neural network layer that needs to extract a feature of the training sample. The selection module of the model may determine, based on the label of the training sample, that the training sample belongs to a first image enhancement task, and further determine a first target neural network layer corresponding to the first image enhancement task.

In this embodiment of this application, for an execution process of the selection module of the model, refer to the selection module 401 in the embodiment corresponding to FIG. 4. Details are not described herein again.

Operation 1003: Perform feature extraction on the training sample by using the first target neural network layer, to obtain a first feature map.

The first target neural network layer performs feature extraction on the training sample, to obtain a feature map (which may be referred to as a first feature map).

In this embodiment of this application, for an execution process of the first target neural network layer of the model, refer to the first target neural network layer 4021 in the embodiment corresponding to FIG. 4. Details are not described herein again.

Operation 1004: Segment the first feature map by using a segmentation module of the model, to obtain n first feature blocks.

The obtained first feature map is further input into a segmentation module of the model, and the segmentation module segments the first feature map, to obtain n feature blocks (which may be referred to as a first feature block). Herein, n≥2.

It should be noted that, in some implementations of this application, a process in which the segmentation module segments the first feature map may be specifically as follows: First, the first feature map is segmented to obtain n segmentation blocks, and then each of the n segmentation blocks is extended to obtain a feature block (that is, the first feature block) represented by a one-dimensional vector. In this way, the n first feature blocks may be obtained.

It should be further noted that, in some implementations of this application, the segmentation module segments the first feature map, and the sizes of the obtained n segmentation blocks may be the same, or may be different. This is not specifically limited herein.

In this embodiment of this application, for an execution process of the segmentation module of the model, refer to the segmentation module 403 in the embodiment corresponding to FIG. 4. Details are not described herein again.

Operation 1005: A transformer module of the model generates, based on related information, n second feature blocks in a one-to-one correspondence with the n first feature blocks, where the related information indicates a correlation between any two of the n first feature blocks.

After obtaining the n first feature blocks, the segmentation module of the model further inputs the n first feature blocks into a transformer module of the model for processing. The transformer module generates related information based on the n first feature blocks. The related information indicates a correlation between any two of the n first feature blocks. Then, the transformer module generates, based on the related information, n second feature blocks in a one-to-one correspondence with the n first feature blocks. In other words, each first feature block not only has feature information of the first feature block, but also integrates feature information of another first feature block based on a correlation with the another first feature block. It should be noted herein that a dimension of then first feature blocks input into the transformer module is the same as a dimension of the n second feature blocks output by the transformer module.

It should be noted that, in some implementations of this application, for example, the transformer module includes at least one encoder and at least one decoder. How the transformer module generates the n second feature blocks in a one-to-one correspondence with the n first feature blocks based on the related information is described as follows: First, the encoder generates first related information, and generates, based on the first related information, n third feature blocks in a one-to-one correspondence with the n first feature blocks. The first related information indicates a first correlation between any two of the n first feature blocks, and a dimension of the n first feature blocks input into the encoder is the same as a dimension of the n third feature blocks. Then, the decoder generates second related information, and generates, based on the second related information, the n second feature blocks in a one-to-one correspondence with the n third feature blocks. The second related information indicates a second correlation between any two of the n third feature blocks, and a dimension of the n third feature blocks input into the decoder is the same as a dimension of the n second feature blocks. It should be noted herein that the second related information is fused with a first task code, and the first task code is used as an input into the decoder. The first task code is a corresponding identifier of the first image enhancement task, or may be considered as a corresponding identifier of the first target neural network layer. Each image enhancement task corresponds to one task code. Because an input image corresponding to each image enhancement task is input into a corresponding first neural network layer, based on the task code, both a specific image enhancement task of an input image from which the n first feature blocks received by the transformer module come and a specific first neural network layer that performs a feature extraction operation to obtain the n first feature blocks may be learned of.

In this embodiment of this application, for an execution process of the transformer module of the model, refer to the transformer module 404 in the embodiment corresponding to FIG. 4. Details are not described herein again.

Operation 1006: Splice and recombine the n second feature blocks by using a recombination module of the model, to obtain a second feature map.

After the transformer module of the model obtains the n second feature blocks based on the n first feature blocks and the related information, a recombination module of the model splices and recombines the n second feature blocks based on a relative spatial location, to obtain a second feature map whose dimension is same as that of the input first feature map.

In this embodiment of this application, for an execution process of the recombination module of the model, refer to the recombination module 405 in the embodiment corresponding to FIG. 4. Details are not described herein again.

Operation 1007: Decode the second feature map by using the second target neural network layer, to obtain a first enhanced image of the training sample, where the second target neural network layer corresponds to the first target neural network layer, and the second target neural network layer is one of m second neural network layers of the model.

The recombination module of the model splices and recombines the n second feature blocks, to obtain the second feature map, and inputs the second feature map into a second target neural network layer uniquely corresponding to the first target neural network layer. The second target neural network layer is one of the m second neural network layers of the model. Then, the second target neural network layer decodes the received second feature map, to obtain an enhanced image (which may be referred to as a first enhanced image) of the training sample.

In this embodiment of this application, for an execution process of the second target neural network layer of the model, refer to the second target neural network layer 4061 in the embodiment corresponding to FIG. 4. Details are not described herein again.

Operation 1008: The training device trains the model based on the first enhanced image, the clean image, and a loss function, to obtain a trained model, where the clean image corresponds to the training sample.

After obtaining the first enhanced image output by the model, the training device trains the model based on the first enhanced image, the clean image, and the loss function, to obtain the trained model. The training sample is obtained by performing image degradation processing on the clean image. Therefore, it may be referred to as that the clean image corresponds to the training sample.

It should be noted that, in this embodiment of this application, a relationship between a degraded image and a corresponding clean image may be shown in Formula (14):

$$I_{corrupted} = f(I_{clean}) \tag{14}$$

Herein, $I_{clean}$ represents the clean image, $I_{corrupted}$ represents the degraded image corresponding to the clean image, and f represents image degradation transformation. A loss function $\mathcal{L}_{IPT}$ for training the model based on such a training set obtained through synthesis may be represented as Formula (15):

$$\mathcal{L}_{IPT} = \mathcal{L}_{supervised} = \Sigma_{i=1}^{N_t} L_1(IPT(I_{corrupted}^i), I_{clean}) \tag{15}$$

Herein, $L_1$ represents an L1 loss function, $I_{corrupted}^i$ represents a degraded image of a task i, and a training objective of the loss function $\mathcal{L}_{IPT}$ is increasing a similarity between the clean image and the first enhanced image.

It should be further noted that, in some implementations of this application, due to diversity of the image degradation model, a degraded image cannot be obtained through synthesis for all image enhancement tasks. Therefore, in this application, a contrastive learning method is introduced to learn of a general function of an unknown task. Specifically, a clean image $x_j$ is used as an input, and an output patch feature generated by the decoder in the transformer model is represented as $f_{D_i}{}^j \in \mathbb{R}^{p^2 \times C}$, i={1, . . . , N}. An objective of contrastive learning is to minimize a distance between codes that are of feature blocks from a same image and that are output by the decoder, and maximize a distance between the code and that of a different image. A loss function of contrastive learning may be shown in Formula (16):

$$l\left(f_{D_{i_1}}^j, f_{D_{i_2}}^j\right) = -\log \frac{\exp\left(d\left(f_{D_{i_1}}^j, f_{D_{i_2}}^j\right)\right)}{\sum_{k=1}^B \mathbb{1}_{k \neq j}\exp\left(d\left(f_{D_{i_1}}^j, f_{D_{i_2}}^j\right)\right)}, \quad (16)$$

$$\mathcal{L}_{contrastive} = \frac{1}{BN^2}\sum_{i_1=1}^N\sum_{i_2=1}^N\sum_{j=1}^B l\left(f_{D_{i_1}}^j, f_{D_{i_2}}^j\right),$$

Herein, $$d(a, b) = \frac{a^T b}{\|a\|\|b\|}$$

indicates a cosine similarity. In addition, in order that the model maintains an original image structure, in some implementations of this application, the loss function $\mathcal{L}_{IPT}$ of the model may be represented as Formula (17):

$$\mathcal{L}_{IPT} = \lambda \mathcal{L}_{constrastive} + \mathcal{L}_{supervised} \quad (17)$$

In other words, in this application, a contrastive loss and a supervised loss are combined and used as a final loss function $\mathcal{L}_{IPT}$ of training the model.

It should be further noted that, in some implementations of this application, the trained model may be deployed on a target device, for example, deployed on an edge device or an end-side device, for example, a mobile phone, a tablet computer, a notebook computer, or a supervision system (for example, a camera).

In the foregoing embodiment of this application, how to train a model constructed in this application to obtain a trained model is specifically described. The model combines a transformer module configured to process a natural language task and different neural network structures, to overcome a limitation that the transformer module can only be used to process the natural language task. The model structure may be applied to a low-level vision task. The model structure includes a plurality of first neural network layers and a plurality of second neural network layers, and different first/second neural network layers correspond to different image enhancement tasks. Therefore, after being trained, a model can be used to process different image enhancement tasks. In addition, compared with a manner in which most existing models that process the low-level vision task are based on a CNN (as a good feature extractor, the CNN plays an important role in a high-level vision task, but can hardly pay attention to global information when processing the low-level vision task), in this application, the model may pay attention to the global information by using the transformer module, to improve an image enhancement effect.

(2) A model structure is a structure corresponding to a model 800.

FIG. 11 is another schematic flowchart of a method for training a model according to an embodiment of this application. The method may specifically include the following operations.

Operation 1101: A training device obtains a training sample, where the training sample is any degraded image in a constructed training set, and each degraded image in the training set is obtained by performing image degradation processing on a clean image.

In this embodiment of this application, operation 1101 is similar to operation 1001, and details are not described herein again.

Operation 1102: The training device inputs the training sample into the model, so that a first neural network layer of the model performs feature extraction on the training sample, to obtain a first feature map.

After obtaining the training sample, the training device inputs the training sample into the model, so that the first neural network layer of the model performs feature extraction on the training sample, to obtain the first feature map.

In this embodiment of this application, for an execution process of the first neural network layer of the model, refer to the first neural network layer 801 in the embodiment corresponding to FIG. 8. Details are not described herein again.

Operation 1103: Segment the first feature map by using a segmentation module of the model, to obtain n first feature blocks.

The obtained first feature map is further input into the segmentation module of the model, and the segmentation module segments the first feature map, to obtain n feature blocks (which may be referred to as a first feature block). Herein, n≥2.

It should be noted that, in some implementations of this application, a process in which the segmentation module segments the first feature map may be specifically as follows: First, the first feature map is segmented to obtain n segmentation blocks, and then each of the n segmentation blocks is extended to obtain a feature block (that is, the first feature block) represented by a one-dimensional vector. In this way, the n first feature blocks may be obtained.

It should be further noted that, in some implementations of this application, the segmentation module segments the first feature map, and sizes of the obtained n segmentation blocks may be the same, or may be different. This is not specifically limited herein.

In this embodiment of this application, for an execution process of the segmentation module of the model, refer to the segmentation module 802 in the embodiment corresponding to FIG. 8. Details are not described herein again.

Operation 1104: A transformer module of the model generates, based on related information, n second feature blocks in a one-to-one correspondence with the n first feature blocks, where the related information indicates a correlation between any two of the n first feature blocks.

After obtaining the n first feature blocks, the segmentation module of the model further inputs the n first feature blocks into a transformer module of the model for processing. The transformer module generates related information based on the n first feature blocks. The related information indicates a correlation between any two of the n first feature blocks. Then, the transformer module generates, based on the related information, n second feature blocks in a one-to-one correspondence with the n first feature blocks. In other words, each first feature block not only has feature information of the first feature block, but also integrates feature information of another first feature block based on a correlation with the another first feature block. It should be noted herein that a dimension of the n first feature blocks input into the transformer module is the same as a dimension of the n second feature blocks output by the transformer module.

It should be noted that, in some implementations of this application, for example, the transformer module includes at least one encoder and at least one decoder. How the transformer module generates the n second feature blocks in a one-to-one correspondence with the n first feature blocks based on the related information is described as follows: First, the encoder generates first related information, and generates, based on the first related information, n third feature blocks in a one-to-one correspondence with the n first feature blocks. The first related information indicates a first correlation between any two of the n first feature blocks, and a dimension of the n first feature blocks input into the encoder is the same as a dimension of the n third feature blocks. Then, the decoder generates second related information, and generates, based on the second related information, the n second feature blocks in a one-to-one correspondence with the n third feature blocks. The second related information indicates a second correlation between any two of the n third feature blocks, and a dimension of the n third feature blocks input into the decoder is the same as a dimension of the n second feature blocks. It should be noted herein that the second related information is fused with a first task code, and the first task code is used as an input into the decoder. The first task code is a corresponding identifier of an image enhancement task to which the input image belongs. Based on the task code, a specific image enhancement task of an input image from which the n first feature blocks received by the transformer module come may be learned of.

In this embodiment of this application, for an execution process of the transformer module of the model, refer to the transformer module 803 in the embodiment corresponding to FIG. 8. Details are not described herein again.

Operation 1105: Splice and recombine the n second feature blocks by using a recombination module of the model, to obtain a second feature map.

After the transformer module of the model obtains the n second feature blocks based on the n first feature blocks and the related information, a recombination module of the model splices and recombines the n second feature blocks based on a relative spatial location, to obtain a second feature map whose dimension is same as that of the input first feature map.

In this embodiment of this application, for an execution process of the recombination module of the model, refer to the recombination module 804 in the embodiment corresponding to FIG. 8. Details are not described herein again.

Operation 1106: Decode the second feature map by using the second neural network layer of the model, to obtain a first enhanced image of the training sample.

The recombination module of the model splices and recombines the n second feature blocks, to obtain the second feature map, and inputs the second feature map into a second neural network layer. Then, the second neural network layer decodes the received second feature map, to obtain an enhanced image (which may be referred to as a first enhanced image) of the training sample.

In this embodiment of this application, for an execution process of the second neural network layer of the model, refer to the second neural network layer 805 in the embodiment corresponding to FIG. 8. Details are not described herein again.

Operation 1107: The training device trains the model based on the first enhanced image, the clean image, and a loss function, to obtain a trained model, where the clean image corresponds to the training sample.

In this embodiment of this application, operation 1107 is similar to operation 1008, and details are not described herein again.

It should be noted that, in some implementations of this application, the trained model may be deployed on a target device, for example, deployed on an edge device or an end-side device, for example, a mobile phone, a tablet computer, a notebook computer, or a supervision system (for example, a camera).

In the foregoing embodiment of this application, how to train another model constructed in this application to obtain a trained model is specifically described. The trained model combines a transformer module configured to process a natural language task and different neural network structures, to overcome a limitation that the transformer module can only be used to process the natural language task. The model structure may be applied to a low-level vision task. The model structure includes one first neural network layer and one second neural network layer, and is used to process a specific image enhancement task. Compared with a manner in which most existing models that process the low-level vision task are based on a CNN (as a good feature extractor, the CNN plays an important role in a high-level vision task, but can hardly pay attention to global information when processing the low-level vision task), in this application, the model may pay attention to the global information by using the transformer module, to improve an image enhancement effect.

B. Inference Phase

In this embodiment of this application, an inference phase describes a process in which an execution device 210 performs corresponding image enhancement processing on a real to-be-processed target image by using a mature model 201. Similarly, in embodiments of this application, a trained model 201 obtained in a training phase may be of a structure of the model 400 corresponding to FIG. 4, or may be of a structure of the model 800 corresponding to FIG. 8. An image enhancement method performed based on the trained model 201 slightly varies with a model structure. The following separately provides descriptions.

(1) A structure of a trained model is a structure corresponding to a model 400.

FIG. 12 is a schematic flowchart of an image enhancement method according to an embodiment of this application. The method may specifically include the following operations.

Operation 1201: An execution device obtains a to-be-processed target image.

The execution device (that is, the foregoing target device) obtains the to-be-processed target image, for example, an image photographed by a mobile phone by using a camera, or an image photographed by a surveillance device by using a camera.

Operation 1202: The execution device inputs the target image into a trained model, a selection module of the trained model determines a first target neural network layer corresponding to the target image, and the first target neural network layer is one of m first neural network layers of the trained model.

The trained model is deployed on the execution device. After obtaining the target image, the execution device inputs the target image into the trained model. The selection module of the trained model determines the first target neural network layer corresponding to the target image. The first target neural network layer is one of the m first neural network layers of the trained model.

Because a real to-be-processed target image does not have a label, the trained model cannot sense a specific type of an image enhancement task corresponding to the target image. In this case, the execution device additionally sends an instruction to the trained model. The instruction indicates a specific type of an image enhancement task to which the target image belongs. To be specific, in an inference phase, the selection module of the trained model determines, based on the received instruction, that the target image belongs to a first image enhancement task, and further determines a first target neural network layer corresponding to the first image enhancement task.

In this embodiment of this application, for an execution process of the selection module of the trained model, refer to the selection module 401 in the embodiment corresponding to FIG. 4. Details are not described herein again.

Operation 1203: Perform feature extraction on the target image by using the first target neural network layer, to obtain a first feature map.

The first target neural network layer performs feature extraction on the target image, to obtain a feature map (which may be referred to as a first feature map).

In this embodiment of this application, for an execution process of the first target neural network layer of the trained model, refer to the first target neural network layer 4021 in the embodiment corresponding to FIG. 4. Details are not described herein again.

Operation 1204: Segment the first feature map by using a segmentation module of the trained model, to obtain n first feature blocks.

The obtained first feature map is further input into the segmentation module of the trained model, and the segmentation module segments the first feature map, to obtain n feature blocks (which may be referred to as a first feature block). Herein, n≥2.

It should be noted that, in some implementations of this application, a process in which the segmentation module segments the first feature map may be specifically as follows: First, the first feature map is segmented to obtain n segmentation blocks, and then each of the n segmentation blocks is extended to obtain a feature block (that is, the first feature block) represented by a one-dimensional vector. In this way, the n first feature blocks may be obtained.

It should be further noted that, in some implementations of this application, the segmentation module segments the first feature map, and sizes of the obtained n segmentation blocks may be the same, or may be different. This is not specifically limited herein.

In this embodiment of this application, for an execution process of the segmentation module of the trained model, refer to the segmentation module 403 in the embodiment corresponding to FIG. 4. Details are not described herein again.

Operation 1205: A transformer module of the trained model generates, based on related information, n second feature blocks in a one-to-one correspondence with the n first feature blocks, where the related information indicates a correlation between any two of the n first feature blocks.

After obtaining the n first feature blocks, the segmentation module of the trained model further inputs the n first feature blocks into the transformer module of the trained model for processing. The transformer module generates related information based on the n first feature blocks. The related information indicates a correlation between any two of the n first feature blocks. Then, the transformer module generates, based on the related information, n second feature blocks in a one-to-one correspondence with the n first feature blocks. In other words, each first feature block not only has feature information of the first feature block, but also integrates feature information of another first feature block based on a correlation with the another first feature block. It should be noted herein that a dimension of the n first feature blocks input into the transformer module is the same as a dimension of the n second feature blocks output by the transformer module.

It should be noted that, in some implementations of this application, for example, the transformer module includes at least one encoder and at least one decoder. How the transformer module generates the n second feature blocks in a one-to-one correspondence with the n first feature blocks based on the related information is described as follows: First, the encoder generates first related information, and generates, based on the first related information, n third feature blocks in a one-to-one correspondence with the n first feature blocks. The first related information indicates a first correlation between any two of the n first feature blocks, and a dimension of the n first feature blocks input into the encoder is the same as a dimension of the n third feature blocks. Then, the decoder generates second related information, and generates, based on the second related information, the n second feature blocks in a one-to-one correspondence with the n third feature blocks. The second related information indicates a second correlation between any two of the n third feature blocks, and a dimension of the n third feature blocks input into the decoder is the same as a dimension of the n second feature blocks. It should be noted herein that the second related information is fused with a first task code, and the first task code is used as an input into the decoder. The first task code is a corresponding identifier of the first image enhancement task, or may be considered as a corresponding identifier of the first target neural network layer. Each image enhancement task corresponds to one task code. Because an input image corresponding to each image enhancement task is input into a corresponding first neural network layer, based on the task code, both a specific image enhancement task of an input image from which the n first feature blocks received by the transformer module come and a specific first neural network layer that performs a feature extraction operation to obtain the n first feature blocks may be learned of.

In this embodiment of this application, for an execution process of the transformer module of the trained model, refer to the transformer module 404 in the embodiment corresponding to FIG. 4. Details are not described herein again.

Operation 1206: Splice and recombine the n second feature blocks by using a recombination module of the trained model, to obtain a second feature map.

After the transformer module of the trained model obtains the n second feature blocks based on the n first feature blocks and the related information, the recombination module of the trained model splices and recombines the n second feature blocks based on a relative spatial location, to obtain a second feature map whose dimension is same as that of the input first feature map.

In this embodiment of this application, for an execution process of the recombination module of the trained model, refer to the recombination module 405 in the embodiment corresponding to FIG. 4. Details are not described herein again.

Operation 1207: Decode the second feature map by using a second target neural network layer, to obtain a second enhanced image of the target image, where the second target neural network layer corresponds to the first target neural network layer, and the second target neural network layer is one of m second neural network layers of the trained model.

The recombination module of the trained model splices and recombines the n second feature blocks, to obtain the second feature map, and inputs the second feature map into a second target neural network layer uniquely corresponding to the first target neural network layer. The second target neural network layer is one of m second neural network layers of the trained model. Then, the second target neural network layer decodes the received second feature map, to obtain an enhanced image (which may be referred to as a second enhanced image) of the target image.

In this embodiment of this application, for an execution process of the second target neural network layer of the trained model, refer to the second target neural network layer 4061 in the embodiment corresponding to FIG. 4. Details are not described herein again.

In the foregoing embodiment of this application, how to actually apply the trained model in this application to obtain the enhanced image corresponding to the target image is specifically described. The trained model combines a transformer module configured to process a natural language task and different neural network structures, to overcome a limitation that the transformer module can only be used to process the natural language task. The model structure may be applied to a low-level vision task. The model structure includes a plurality of first neural network layers and a plurality of second neural network layers, and different first/second neural network layers correspond to different image enhancement tasks. Therefore, after being trained, a model can be used to process different image enhancement tasks. In addition, compared with a manner in which most existing models that process the low-level vision task are based on a CNN (as a good feature extractor, the CNN plays an important role in a high-level vision task, but can hardly pay attention to global information when processing the low-level vision task), in this application, the model may pay attention to the global information by using the transformer module, to improve an image enhancement effect.

(2) A structure of a trained model is a structure corresponding to a model 800.

FIG. 13 is another schematic flowchart of an image enhancement method according to an embodiment of this application. The method may specifically include the following operations.

Operation 1301: An execution device obtains a to-be-processed target image.

In this embodiment of this application, operation 1301 is similar to operation 1201, and details are not described herein again.

Operation 1302: The execution device inputs the target image into a trained model, and a first neural network layer of the trained model performs feature extraction on the target image, to obtain a first feature map.

The trained model is deployed on the execution device. After obtaining the target image, the execution device inputs the target image into the trained model. The first neural network layer of the trained model performs feature extraction on the target image, to obtain the first feature map.

In this embodiment of this application, for an execution process of the first neural network layer of the trained model, refer to the first neural network layer 801 in the embodiment corresponding to FIG. 8. Details are not described herein again.

Operation 1303: Segment the first feature map by using a segmentation module of the trained model, to obtain n first feature blocks.

The obtained first feature map is further input into the segmentation module of the trained model, and the segmentation module segments the first feature map, to obtain n feature blocks (which may be referred to as a first feature block). Herein, n≥2.

It should be noted that, in some implementations of this application, a process in which the segmentation module segments the first feature map may be specifically as follows: First, the first feature map is segmented to obtain n segmentation blocks, and then each of the n segmentation blocks is extended to obtain a feature block (that is, the first feature block) represented by a one-dimensional vector. In this way, the n first feature blocks may be obtained.

It should be further noted that, in some implementations of this application, the segmentation module segments the first feature map, and sizes of the obtained n segmentation blocks may be the same, or may be different. This is not specifically limited herein.

In this embodiment of this application, for an execution process of the segmentation module of the trained model, refer to the segmentation module 802 in the embodiment corresponding to FIG. 8. Details are not described herein again.

Operation 1304: A transformer module of the trained model generates, based on related information, n second feature blocks in a one-to-one correspondence with the n first feature blocks, where the related information indicates a correlation between any two of the n first feature blocks.

After obtaining the n first feature blocks, the segmentation module of the trained model further inputs the n first feature blocks into the transformer module of the trained model for processing. The transformer module generates related information based on the n first feature blocks. The related information indicates a correlation between any two of the n first feature blocks. Then, the transformer module generates, based on the related information, n second feature blocks in a one-to-one correspondence with the n first feature blocks. In other words, each first feature block not only has feature information of the first feature block, but also integrates feature information of another first feature block based on a correlation with the another first feature block. It should be noted herein that a dimension of the n first feature blocks input into the transformer module is the same as a dimension of the n second feature blocks output by the transformer module.

It should be noted that, in some implementations of this application, for example, the transformer module includes at least one encoder and at least one decoder. How the transformer module generates the n second feature blocks in a one-to-one correspondence with the n first feature blocks based on the related information is described as follows: First, the encoder generates first related information, and generates, based on the first related information, n third feature blocks in a one-to-one correspondence with the n first feature blocks. The first related information indicates a first correlation between any two of the n first feature blocks, and a dimension of the n first feature blocks input into the encoder is the same as a dimension of the n third feature blocks. Then, the decoder generates second related information, and generates, based on the second related information, the n second feature blocks in a one-to-one correspondence with the n third feature blocks. The second related information indicates a second correlation between any two of the n third feature blocks, and a dimension of the n third feature blocks input into the decoder is the same as a dimension of the n second feature blocks. It should be noted herein that the second related information is fused with a first task code, and the first task code is used as an input into the decoder. The first task code is a corresponding identifier of an image enhancement task to which the input image belongs. Based on the task code, a specific image enhancement task of an input image from which the n first feature blocks received by the transformer module come may be learned of.

In this embodiment of this application, for an execution process of the transformer module of the trained model, refer to the transformer module 803 in the embodiment corresponding to FIG. 8. Details are not described herein again.

Operation 1305: Splice and recombine the n second feature blocks by using a recombination module of the trained model, to obtain a second feature map.

After the transformer module of the trained model obtains the n second feature blocks based on the n first feature blocks and the related information, a recombination module of the trained model splices and recombines the n second feature blocks based on a relative spatial location, to obtain a second feature map whose dimension is same as that of the input first feature map.

In this embodiment of this application, for an execution process of the recombination module of the trained model, refer to the recombination module 804 in the embodiment corresponding to FIG. 8. Details are not described herein again.

Operation 1306: Decode the second feature map by using a second neural network layer of the trained model, to obtain a second enhanced image of the target image.

The recombination module of the trained model splices and recombines the n second feature blocks, to obtain the second feature map, and inputs the second feature map into the second neural network layer. Then, the second neural network layer decodes the received second feature map, to obtain an enhanced image (which may be referred to as a second enhanced image) of the training sample.

In this embodiment of this application, for an execution process of the second neural network layer of the model, refer to the second neural network layer 805 in the embodiment corresponding to FIG. 8. Details are not described herein again.

In the foregoing embodiment of this application, how to actually apply the trained model in this application to obtain the enhanced image corresponding to the target image is specifically described. The trained model combines a transformer module configured to process a natural language task and different neural network structures, to overcome a limitation that the transformer module can only be used to process the natural language task. The model structure may be applied to a low-level vision task. The model structure includes one first neural network layer and one second neural network layer, and is used to process a specific image enhancement task. Compared with a manner in which most existing models that process the low-level vision task are based on a CNN (as a good feature extractor, the CNN plays an important role in a high-level vision task, but can hardly pay attention to global information when processing the low-level vision task), in this application, the model may pay attention to the global information by using the transformer module, to improve an image enhancement effect.

It should be noted that a model structure constructed in embodiments of this application and a trained model obtained by training a model may be applied to a plurality of image enhancement tasks. In an actual application, the trained model in embodiments of this application may be used to process an image enhancement task (for example, super-resolution reconstruction, denoising, defogging, and deraining) in fields such as an intelligent camera, smart city, and an intelligent terminal. The following describes a plurality of application scenarios in which a product is implemented.

(1) Repair an Image of a Camera

Figure 14:
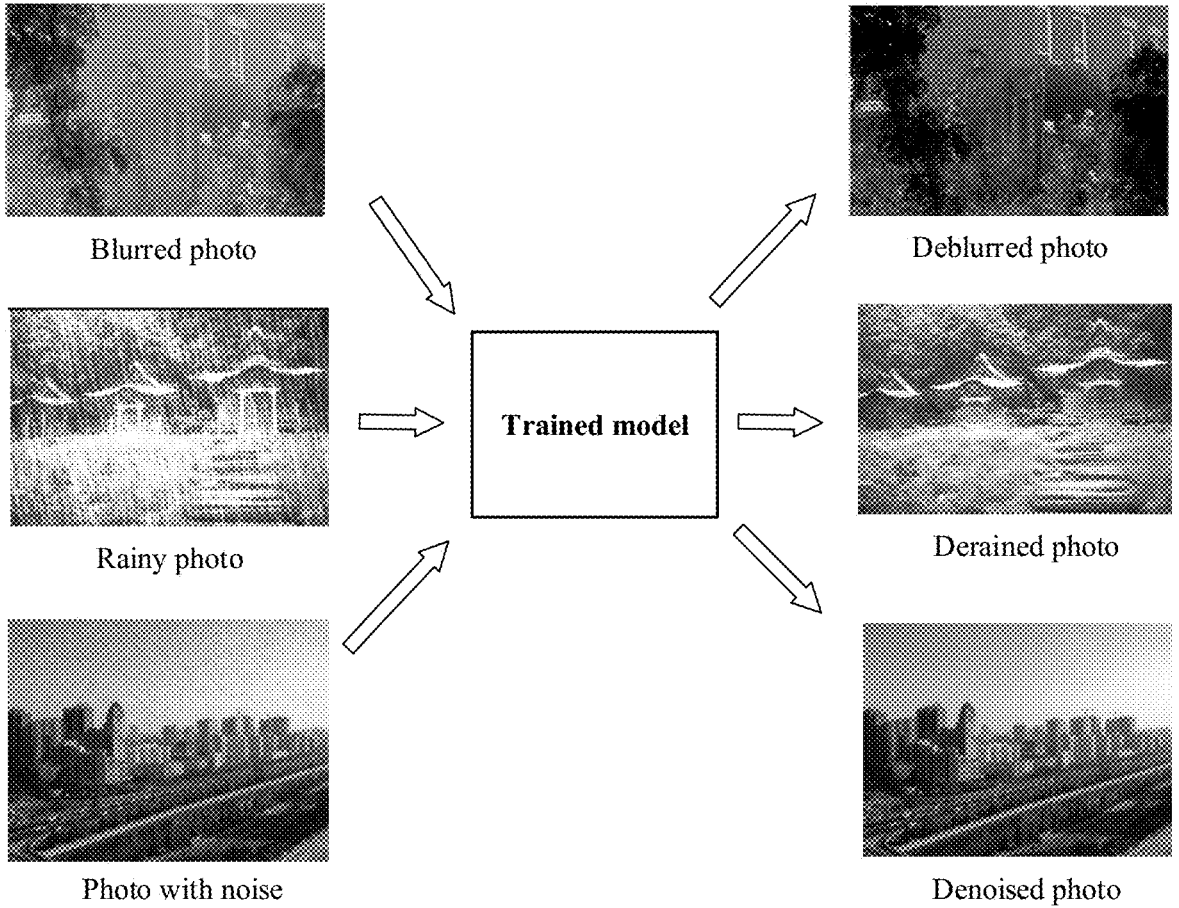
FIG. 14 is a schematic diagram of an application scenario according to an embodiment of this application.

Repairing an image of a camera is a very important technology, and has great use value in scenarios such as processing an imaging effect of a mobile phone. Currently, a main method for repairing the image of the camera is performed by using a plurality of convolutional neural network models for different image enhancement tasks. A model structure constructed in this application is used. As shown in FIG. 14, different types of image enhancement tasks can be implemented by using one model, and an effect better than that of a plurality of convolutional neural network models of a specific task can be implemented.

(2) Optimize Photographing of a Mobile Phone

A trained model in this application may be used to optimize photographing of a terminal (for example, a mobile phone, a smartwatch, or a personal computer). For example, the terminal is a mobile phone. When a user uses the mobile phone for photographing, a target such as a face or an animal is automatically captured, to help the mobile phone perform automatic focus, beautification, or the like. If a distance between the mobile phone and a photographed object is far, an image captured by the mobile phone may be unclear. Therefore, the trained model in this application may be applied to the mobile phone. The trained model effectively retains detail information of an image pixel, and image quality obtained after optimization is also higher than that of an image optimized in an existing neural network. Better user experience can be brought to the user, and product quality of the mobile phone can be improved.

It should be noted that the trained model in this application not only may be applied to the foregoing application scenarios, but also may be applied to each subdivision field in the artificial intelligence field. The trained model provided in embodiments of this application may be applied to any field and device for which a neural network can be used. An example is not provided herein again.

To more intuitively understand beneficial effects brought by embodiments of this application, the following further provides a comparison of the technical effects brought by embodiments of this application. Table 1 shows a comparison result between this application and a CNN-based best model. It can be learned from Table 1 that, a model constructed in this application and a model obtained through training in the training method are used, to achieve, in terms of a plurality of image enhancement tasks and a plurality of datasets, performance that surpasses that of a CNN model. In addition, it should be noted that different CNNs need to be used for different super-resolution, and for the model provided in this application, one model may be applied to different types of image enhancement tasks.

TABLE 1

PSNR results of a model constructed in this application and a
CNN model in terms of a super-resolution reconstruction task

| Super-resolution method | Super-resolution | Set5 dataset | Set14 dataset | B100 dataset | Urban100 dataset |
|---|---|---|---|---|---|
| CNN | ×2 | 38.24 | 34.07 | 32.41 | 33.23 |
| This application | ×2 | 38.37 | 34.43 | 32.48 | 33.76 |
| CNN | ×3 | 34.72 | 30.66 | 29.31 | 29.03 |
| This application | ×3 | 34.81 | 30.85 | 29.38 | 29.38 |
| CNN | ×4 | 32.57 | 28.85 | 27.77 | 26.84 |
| This application | ×4 | 32.64 | 29.01 | 27.82 | 27.26 |

Figure 15:
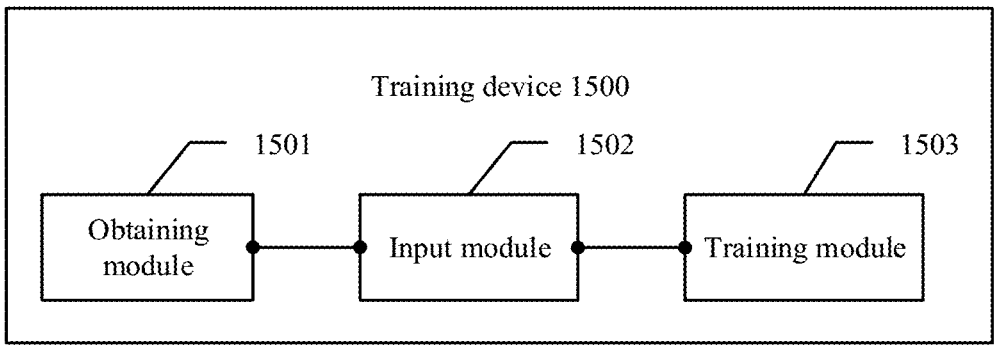
FIG. 15 is a schematic diagram of a training device according to an embodiment of this application.

Based on the foregoing embodiments, to better implement the solutions in embodiments of this application, the following further provides a related device configured to implement the foregoing solutions. Specifically, FIG. 15 is a schematic diagram of a training device according to an embodiment of this application. A training device 1500 may specifically include an obtaining module 1501, an input module 1502, and a training module 1503. The obtaining module 1501 is configured to obtain a training sample. The training sample is any degraded image in a constructed training set, and each degraded image in the training set is obtained by performing image degradation processing on a clean image. The input module 1502 is configured to input the training sample into a model deployed on the training device 1500, so that the model processes the training sample, to obtain a first enhancement image of the training sample. The training module 1503 is configured to train, based on the first enhanced image, the clean image, and a loss function, the model deployed on the training device 1500, to obtain a trained model. The clean image corresponds to the training sample.

It should be noted that, in this embodiment of this application, for a specific execution process of the model deployed on the training device 1500, refer to the model 400 in the embodiment corresponding to FIG. 4 or the model 800 in the embodiment corresponding to FIG. 8. Details are not described herein again.

It should be noted that content such as information exchange and an execution process between modules/units in the training device 1500 is based on a same concept as the method embodiment corresponding to FIG. 10 or FIG. 11 in this application. For specific content, refer to descriptions in the method embodiments in this application. Details are not described herein again.

Figure 16:
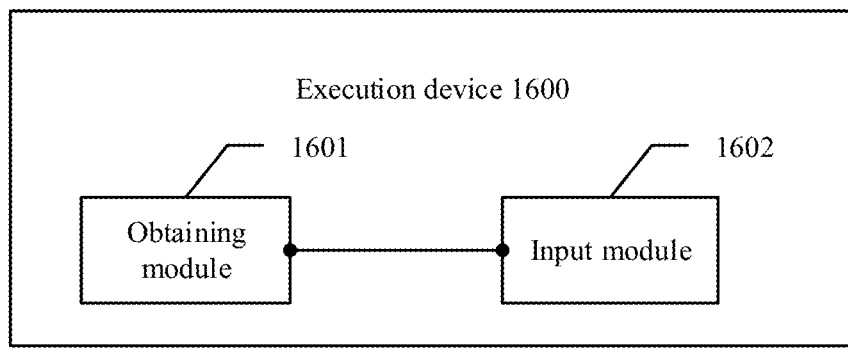
FIG. 16 is a schematic diagram of an execution device according to an embodiment of this application.

An embodiment of this application further provides an execution device. FIG. 16 is a schematic diagram of an execution device according to an embodiment of this application. An execution device 1600 includes an obtaining module 1601 and an input module 1602. The obtaining module 1601 is configured to obtain a to-be-processed target image. The input module 1602 is configured to input the target image into a trained model deployed on the execution device 1600, so that the trained model processes the target image, to obtain a second enhanced image of the target image.

It should be noted that, in this embodiment of this application, for a specific execution process of the model deployed on the execution device 1600, refer to the model 400 in the embodiment corresponding to FIG. 4 or the model 800 in the embodiment corresponding to FIG. 8. Details are not described herein again.

It should be noted that content such as information exchange and an execution process between modules/units in the execution device 1600 is based on a same concept as the method embodiment corresponding to FIG. 12 or FIG. 13 in this application. For specific content, refer to descriptions in the method embodiments in this application. Details are not described herein again.

Figure 17:
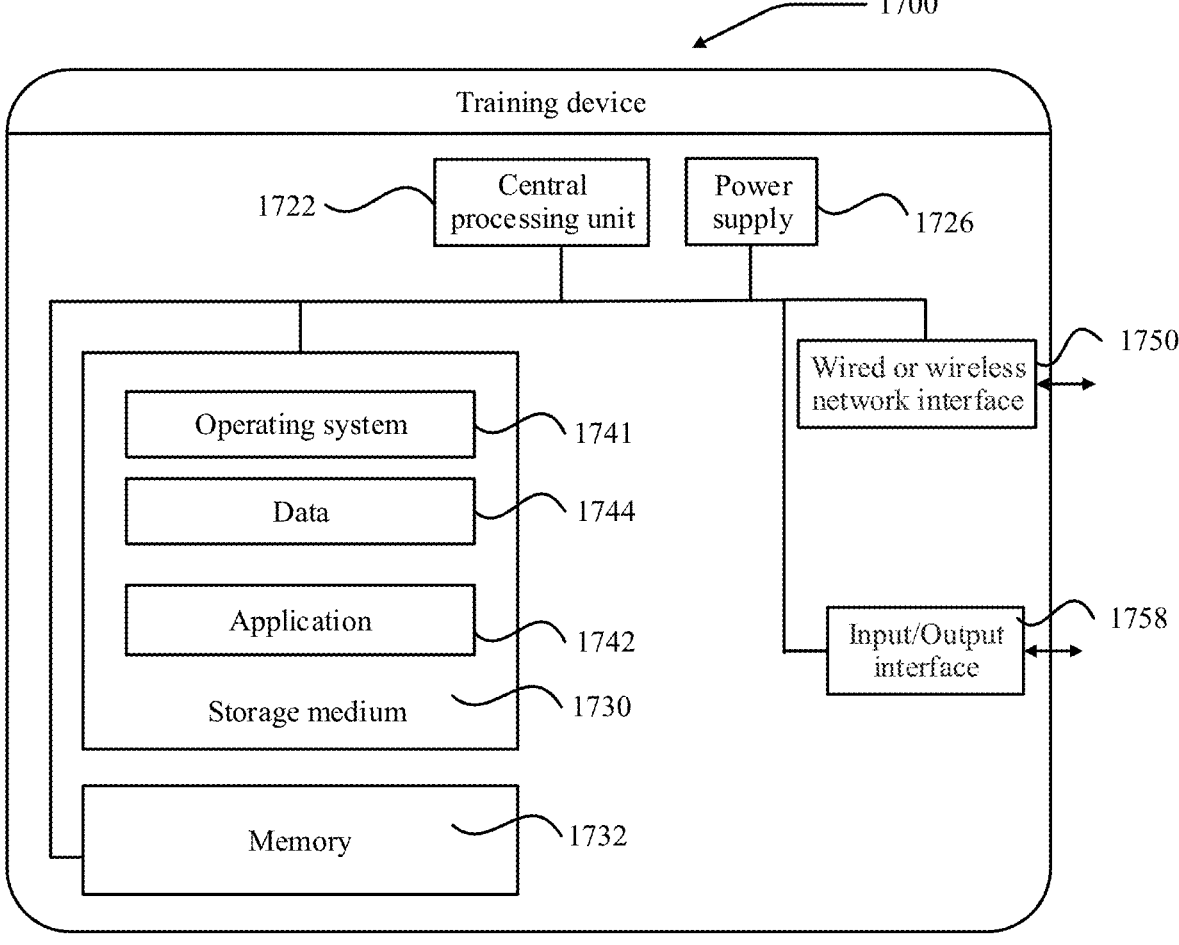
FIG. 17 is another schematic diagram of a training device according to an embodiment of this application.

The following describes another training device provided in an embodiment of this application. FIG. 17 is a schematic diagram of a structure of a training device according to an embodiment of this application. The training device 1500 described in the embodiment corresponding to FIG. 15 may be deployed on a training device 1700, to implement a function of the training device 1500 in the embodiment corresponding to FIG. 15. Specifically, the training device 1700 is implemented by one or more servers. The training device 1700 may have a large difference due to a different configuration or different performance, and may include one or more central processing units (CPU) 1722, a memory 1732, and one or more storage media 1730 (for example, one or more mass storage devices) storing an application 1742 or data 1744. The memory 1732 and the storage medium 1730 may perform transitory storage or persistent storage. The program stored in the storage medium 1730 may include one or more modules (not shown in the figure), and each module may include a series of instruction operations for the training device 1700. Further, the central processing unit 1722 may be configured to: communicate with the storage medium 1730, and perform the series of instruction operations in the storage medium 1730 on the training device 1700.

The training device 1700 may further include one or more power supplies 1726, one or more wired or wireless network interfaces 1750, one or more input/output interfaces 1758, and/or one or more operating systems 1741 such as Windows Server™, MacOS X™, Unix™, Linux™, and Free-BSD™.

In this embodiment of this application, the central processing unit 1722 is configured to perform the method that is for training a model and that is performed by the training device in the embodiment corresponding to FIG. 10 or FIG. 11.

It should be noted that, a specific manner in which central processing unit 1722 performs the foregoing operations is based on a same concept as the method embodiment corresponding to FIG. 10 or FIG. 11 in this application. Technical effects brought by the central processing unit 1722 are also the same as those in the foregoing embodiments in this application. For specific content, refer to descriptions in the method embodiments in this application. Details are not described herein again.

Figure 18:
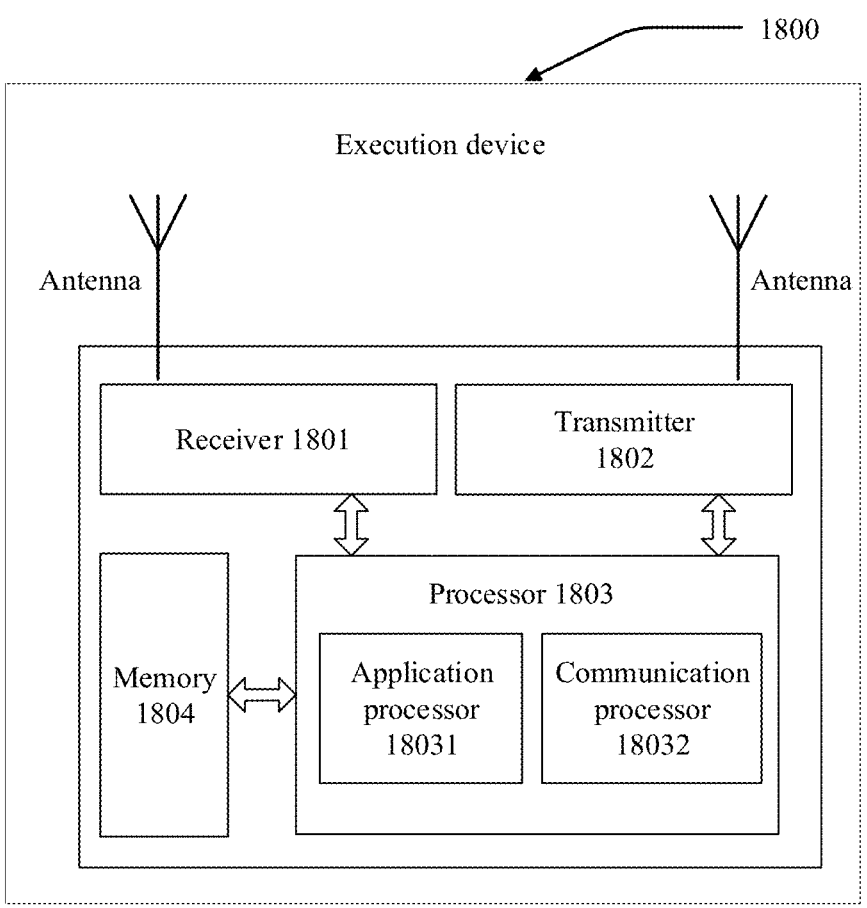
FIG. 18 is another schematic diagram of an execution device according to an embodiment of this application.

The following describes an execution device provided in an embodiment of this application. FIG. 18 is a schematic diagram of a structure of an execution device according to an embodiment of this application. An execution device 1800 may be specifically represented as various terminal devices such as a virtual reality VR device, a mobile phone, a tablet computer, a notebook computer, a smart wearable device, a monitoring data processing device, or a radar data processing device. This is not limited herein. The execution device 1600 described in the embodiment corresponding to FIG. 16 may be deployed on the execution device 1800, and is configured to implement a function of the execution device 1600 in the embodiment corresponding to FIG. 16. Specifically, the execution device 1800 includes a receiver 1801, a transmitter 1802, a processor 1803, and a memory 1804 (there may be one or more processors 1803 in the execution device 1800, and one processor is used as an example in FIG. 18). The processor 1803 may include an application processor 18031 and a communication processor 18032. In some embodiments of this application, the receiver 1801, the transmitter 1802, the processor 1803, and the memory 1804 may be connected through a bus or in another manner.

The memory 1804 may include a read-only memory and a random access memory, and provide instructions and data for the processor 1803. A part of the memory 1804 may further include a nonvolatile random access memory (NVRAM). The memory 1804 stores operation instructions that can be performed by the processor, an executable module or a data structure, a subnet thereof, or an expanded set thereof. The operation instructions may include various operation instructions, to implement various operations.

The processor 1803 controls an operation of the execution device 1800. In a specific application, components of the execution device 1800 are coupled together through a bus system. In addition to a data bus, the bus system may further include a power bus, a control bus, a status signal bus, and the like. However, for clear description, various types of buses in the figure are referred to as the bus system.

The method disclosed in the embodiment corresponding to FIG. 12 or FIG. 13 in this application may be applied to the processor 1803, or implemented by the processor 1803. The processor 1803 may be an integrated circuit chip, and has a signal processing capability. In an implementation process, operations in the methods may be implemented by using a hardware integrated logic circuit in the processor 1803, or by using instructions in a form of software. The processor 1803 may be a general-purpose processor, a digital signal processor (DSP), a microprocessor, or a microcontroller. The processor 1803 may further include an application-specific integrated circuit (ASIC), a field programmable gate array (FPGA) or another programmable logic device, a discrete gate, a transistor logic device, or a discrete hardware component. The processor 1803 may implement or perform the methods, operations, and logical block diagrams that are disclosed in the embodiment corresponding to FIG. 12 or FIG. 13 in this application. The general-purpose processor may be a microprocessor, or the processor may be any conventional processor, or the like. The operations in the methods disclosed with reference to embodiments of this application may be directly performed and completed by a hardware decoding processor, or may be performed and completed by a combination of hardware and a software module in the decoding processor. The software module may be located in a mature storage medium in the art such as a random access memory, a flash memory, a read-only memory, a programmable read-only memory, an electrically erasable programmable memory, or a register. The storage medium is located in the memory 1804, and the processor 1803 reads information in the memory 1804 and completes the operations in the foregoing methods in combination with hardware of the processor 1803.

The receiver 1801 may be configured to: receive input digit or character information, and generate a signal input related to related settings and functional control of the execution device 1800. The transmitter 1802 may be configured to output the digital or character information through a first interface. The transmitter 1802 may further be configured to send instructions to a disk group through the first interface, to modify data in the disk group. The transmitter 1802 may further include a display device such as a display.

In this embodiment of this application, in a case, the processor 1803 is configured to perform image enhancement processing on an input target image by using a trained model, to obtain a corresponding enhanced image. The trained model may be obtained in the training method corresponding to FIG. 10 or FIG. 11 in this application. For specific content, refer to descriptions in the method embodiments in this application. Details are not described herein again.

An embodiment of this application further provides a computer-readable storage medium. The computer-readable storage medium stores a program used to perform signal processing. When the program runs on a computer, the computer is enabled to perform operations performed by a training device in the foregoing embodiments, or the computer is enabled to perform operations performed by an execution device in the embodiment shown in FIG. 16.

The training device, the execution device, or the like in this embodiment of this application may be specifically a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in the training device performs operations performed by the training device described in the foregoing embodiments, or a chip in the execution device performs operations performed by the execution device described in the embodiment shown in FIG. 16.

Optionally, the storage unit is a storage unit in the chip, for example, a register or a cache. Alternatively, the storage unit may be a storage unit in a wireless access device but outside the chip, for example, a read-only memory (ROM), another type of static storage device that can store static information and instructions, or a random access memory (RAM).

Figure 19:
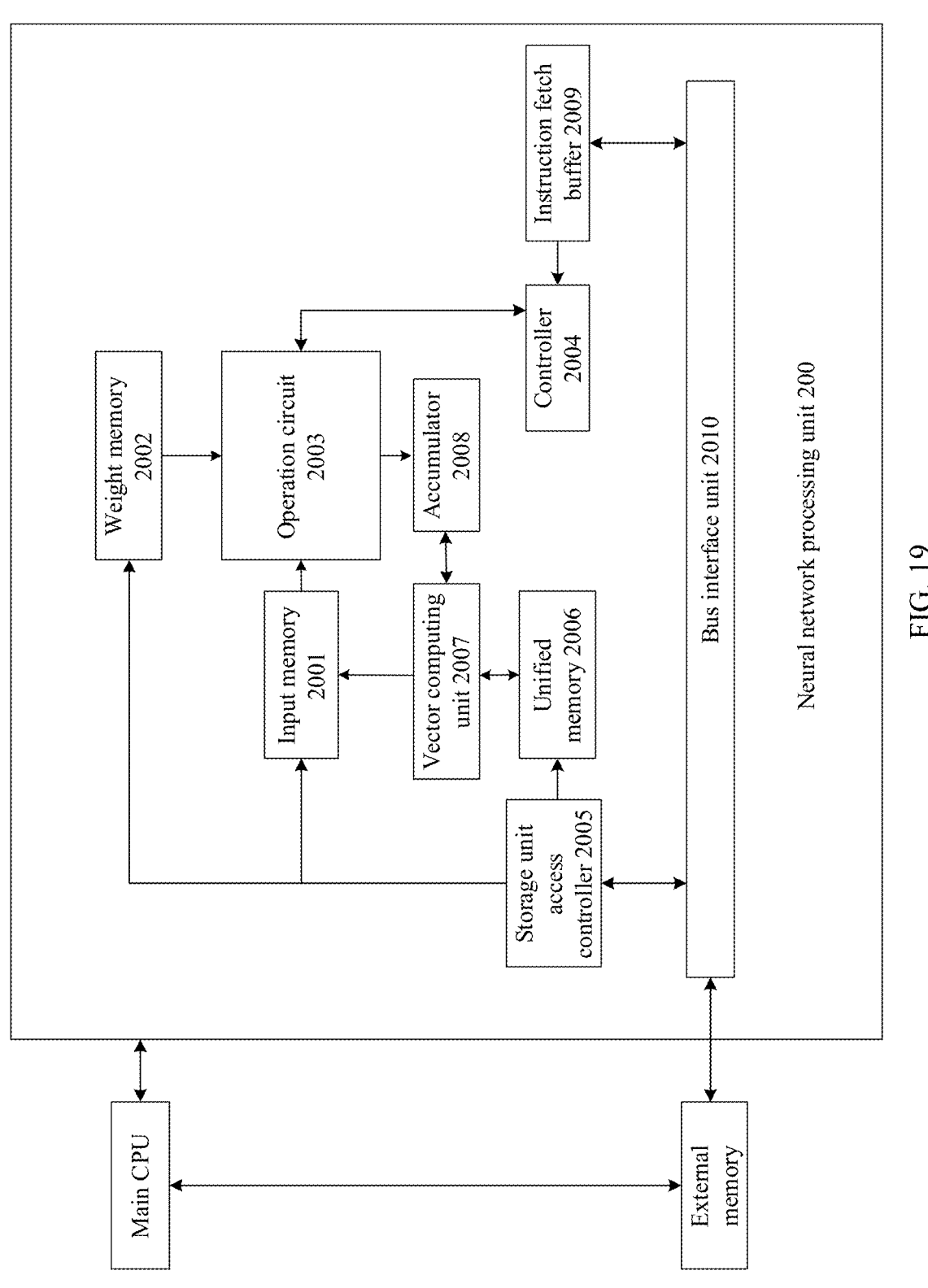
FIG. 19 is a schematic diagram of a structure of a chip according to an embodiment of this application.

Specifically, FIG. 19 is a schematic diagram of a structure of a chip according to an embodiment of this application. The chip may be represented as a neural network processing unit NPU 200. The NPU 200 is mounted on a host CPU as a coprocessor, and the host CPU allocates a task. A core part of the NPU is an operation circuit 2003, and a controller 2004 controls the operation circuit 2003 to extract matrix data in a memory and perform a multiplication operation.

In some implementations, a plurality of processing units (PE) are included inside the operation circuit 2003. In some implementations, the operation circuit 2003 is a two-dimensional systolic array. The operation circuit 2003 may alternatively be a one-dimensional systolic array or another electronic circuit that can perform mathematical operations such as multiplication and addition. In some implementations, the operation circuit 2003 is a general-purpose matrix processor.

For example, it is assumed that there is an input matrix A, a weight matrix B, and an output matrix C. The operation circuit fetches, from a weight memory 2002, data corresponding to the matrix B, and caches the data on each PE in the operation circuit. The operation circuit fetches data of the matrix A from an input memory 2001, to perform a matrix operation on the matrix B, and stores an obtained partial result or an obtained final result of the matrix in an accumulator 2008.

A unified memory 2006 is configured to store input data and output data. Weight data is directly transferred to the weight memory 2002 by using a direct memory access controller (DMAC) 2005. The input data is also transferred to the unified memory 2006 by using the DMAC.

A bus interface unit (BIU) 2010 is configured to interact with the DMAC and an instruction fetch buffer (IFB) 2009 through an AXI bus.

The bus interface unit 2010 is configured for the instruction fetch buffer 2009 to obtain an instruction from an external memory, and is further configured for the direct memory access controller 2005 to obtain original data of the input matrix A or the weight matrix B from the external memory.

The DMAC is mainly configured to transfer input data in the external memory DDR to the unified memory 2006, or transfer the weight data to the weight memory 2002, or transfer the input data to the input memory 2001.

A vector computing unit 2007 includes a plurality of operation processing units. If required, further processing is performed on an output of the operation circuit, for example, vector multiplication, vector addition, an exponential operation, a logarithmic operation, or a value comparison. The vector computing unit 2007 is mainly configured to perform network computation at a non-convolutional/fully connected layer of a neural network, for example, batch normalization, pixel-level summation, and upsampling on a feature plane.

In some implementations, the vector computing unit 2007 can store a processed output vector in the unified memory 2006. For example, the vector computing unit 2007 may apply a linear function or a non-linear function to an output of the operation circuit 2003, for example, perform linear interpolation on a feature plane extracted at a convolutional layer. For another example, the linear function or the non-linear function is applied to a vector of an accumulated value to generate an activation value. In some implementations, the vector computing unit 2007 generates a normalized value, a pixel-level sum, or a normalized value and a pixel-level sum. In some implementations, the processed output vector can be used as an activation input into the operation circuit 2003, for example, to be used at a subsequent layer of the neural network.

The instruction fetch buffer 2009 connected to the controller 2004 is configured to store instructions used by the controller 2004.

The unified memory 2006, the input memory 2001, the weight memory 2002, and the instruction fetch buffer 2009 are all on-chip memories. The external memory is private for a hardware architecture of the NPU.

The processor mentioned anywhere above may be a general-purpose central processing unit, a microprocessor, an ASIC, or one or more integrated circuits that are configured to control program execution of the method according to the first aspect.

In addition, it should be noted that the apparatus embodiments described above are merely an example. The units described as separate parts may or may not be physically separate, and parts displayed as units may or may not be physical units, may be located in one place, or may be distributed on a plurality of network units. Some or all of the modules may be selected based on an actual requirement, to achieve objectives of the solutions in embodiments. In addition, in the accompanying drawings of the apparatus embodiments provided in this application, a connection relationship between modules indicates that the modules have a communication connection with each other, and may be specifically implemented as one or more communication buses or signal cables.

Based on the description of the foregoing embodiments, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Usually, any function implemented by a computer program may be easily implemented by using corresponding hardware. In addition, specific hardware structures used to implement a same function may be various, for example, an analog circuit, a digital circuit, or a dedicated circuit. However, in this application, a software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods in embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some procedures or functions in embodiments of this application are generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from one website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium that can be stored by the computer, or a data storage device, for example, a training device or a data center in which one or more usable media are integrated. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A model structure, comprising:
   a selection module, m first neural network layers, m second neural network layers, a segmentation module, a recombination module, and a transformer module, wherein one first neural network layer uniquely corresponds to one second neural network layer, and m≥2, wherein
   the selection module is configured to: obtain an input image, and determine a first target neural network layer corresponding to the input image, wherein the first target neural network layer is one of the m first neural network layers;
   the first target neural network layer is configured to perform feature extraction on the input image, to obtain a first feature map;
   the segmentation module is configured to segment the first feature map, to obtain n first feature blocks, wherein n≥2;
   the transformer module is configured to generate, based on related information, n second feature blocks in a one-to-one correspondence with the n first feature blocks, wherein the related information indicates a correlation between any two of the n first feature blocks; and the recombination module is configured to splice and recombine the n second feature blocks, to obtain a second feature map; and a second target neural network layer, configured to decode the second feature map, to obtain an output image, wherein the second target neural network layer corresponds to the first target neural network layer, and the second target neural network layer is one of the m second neural network layers.

2. The structure according to claim 1, wherein different first neural network layers correspond to different image enhancement tasks, and the selection module is configured to:

obtain the input image, and determine that the input image belongs to a first image enhancement task; and determine a first target neural network layer corresponding to the first image enhancement task.

3. The structure according to claim 2, wherein the input image is a training sample in a training set, and the selection module is further configured to:

obtain the training sample, and determine, based on a label of the training sample, that the training sample belongs to the first image enhancement task.

4. The structure according to claim 2, wherein the input image is a to-be-processed target image, and the selection module is further configured to:

obtain the target image, and determine, based on a received instruction, that the target image belongs to the first image enhancement task.

5. The structure according to claim 2, wherein the transformer module comprises an encoder and a decoder;

the encoder is configured to: generate first related information, and generate, based on the first related information, n third feature blocks in a one-to-one correspondence with the n first feature blocks, wherein the first related information indicates a first correlation between any two of the n first feature blocks; and the decoder is configured to: generate second related information, and generate, based on the second related information, the n second feature blocks in a one-to-one correspondence with the n third feature blocks, wherein the second related information comprises a first task code, the first task code is a corresponding identifier of the first image enhancement task, and the second related information indicates a second correlation between any two of the n third feature blocks.

6. The structure according to claim 1, wherein the segmentation module is configured to:

segment the first feature map, to obtain n segmentation blocks; and extend each of the n segmentation blocks to obtain a first feature block represented by a one-dimensional vector, to obtain the n first feature blocks.

7. The structure according to claim 6, wherein sizes of the n segmentation blocks are the same.

8. A method for training a model, comprising:

obtaining a training sample, wherein the training sample is any degraded image in a constructed training set, and each degraded image in the training set is obtained by performing image degradation processing on a clean image;

inputting the training sample into the model, and determining, by using a selection module, a first target neural network layer corresponding to the training sample, wherein the first target neural network layer is one of m first neural network layers, wherein the model comprises the selection module, the m first neural network layers, m second neural network layers, a segmentation module, a recombination module, and a transformer module;

performing feature extraction on the training sample by using the first target neural network layer, to obtain a first feature map;

segmenting the first feature map by using the segmentation module, to obtain n first feature blocks, wherein $n \geq 2$;

generating, based on related information, n second feature blocks in a one-to-one correspondence with the n first feature blocks by using the transformer module, wherein the related information indicates a correlation between any two of the n first feature blocks;

splicing and recombining the n second feature blocks by using the recombination module, to obtain a second feature map;

decoding the second feature map by using a second target neural network layer, to obtain a first enhanced image of the training sample, wherein the second target neural network layer corresponds to the first target neural network layer, and the second target neural network layer is one of the m second neural network layers; and training the model based on the first enhanced image, the clean image, and a loss function, to obtain a trained model, wherein the clean image corresponds to the training sample.

9. The method according to claim 8, wherein the determining, by using the selection module, a first target neural network layer corresponding to the training sample comprises:

determining, based on a label of the training sample by using the selection module, that the training sample belongs to a first image enhancement task, and determining a first target neural network layer corresponding to the first image enhancement task, wherein different first neural network layers correspond to different image enhancement tasks.

10. The method according to claim 8, wherein the generating, based on related information, n second feature blocks in a one-to-one correspondence with the n first feature blocks by using the transformer module comprises:

generating first related information by using an encoder, and generating, based on the first related information, n third feature blocks in a one-to-one correspondence with the n first feature blocks, wherein the first related information indicates a first correlation between any two of the n first feature blocks, wherein the transformer module comprises the encoder and a decoder; and generating second related information by using the decoder, and generating, based on the second related information, the n second feature blocks in a one-to-one correspondence with the n third feature blocks, wherein the second related information comprises a first task code, the first task code is a corresponding identifier of the first image enhancement task, and the second related information indicates a second correlation between any two of the n third feature blocks.

11. The method according to claim 8, wherein the segmenting the first feature map by using the segmentation module, to obtain n first feature blocks comprises:

segmenting the first feature map by using the segmentation module, to obtain n segmentation blocks, and extending each of the n segmentation blocks to obtain a first feature block represented by a one-dimensional vector, to obtain the n first feature blocks.

12. The method according to claim 11, wherein sizes of the n segmentation blocks are the same.

13. The method according to claim 8, further comprising: deploying the trained model on a target device.

14. An image enhancement method, comprising:

obtaining a to-be-processed target image;

inputting the target image into a trained model, wherein the trained model comprises a selection module, m first neural network layers, m second neural network layers, a segmentation module, a recombination module, and a transformer module;

determining, by using the selection module, a first target neural network layer corresponding to the target image, wherein the first target neural network layer is one of the m first neural network layers;

performing feature extraction on the target image by using the first target neural network layer, to obtain a first feature map;

segmenting the first feature map by using the segmentation module, to obtain n first feature blocks, wherein $n \geq 2$;

generating, based on related information, n second feature blocks in a one-to-one correspondence with the n first feature blocks by using the transformer module, wherein the related information indicates a correlation between any two of the n first feature blocks;

splicing and recombining the n second feature blocks by using the recombination module, to obtain a second feature map; and decoding the second feature map by using a second target neural network layer, to obtain a second enhanced image of the target image, wherein the second target neural network layer corresponds to the first target neural network layer, and the second target neural network layer is one of the m second neural network layers.

15. The method according to claim 14, wherein the determining, by using the selection module, a first target neural network layer corresponding to the target image comprises:

determining, based on a received instruction by using the selection module, that the target image belongs to a first image enhancement task, and determining a first target neural network layer corresponding to the first image enhancement task, wherein different first neural network layers correspond to different image enhancement tasks.

16. The method according to claim 14, wherein the generating, based on related information, n second feature blocks in a one-to-one correspondence with the n first feature blocks by using the transformer module comprises:

generating first related information by using an encoder, and generating, based on the first related information, n third feature blocks in a one-to-one correspondence with the n first feature blocks, wherein the first related information indicates a first correlation between any two of the n first feature blocks, wherein the transformer module comprises the encoder and a decoder; and generating second related information by using the decoder, and generating, based on the second related information, the n second feature blocks in a one-to-one correspondence with the n third feature blocks, wherein the second related information comprises a first task code, the first task code is a corresponding identifier of the first image enhancement task, and the second related information indicates a second correlation between any two of the n third feature blocks.

17. The method according to claim 14, wherein the segmenting the first feature map by using the segmentation module, to obtain n first feature blocks comprises:

segmenting the first feature map by using the segmentation module, to obtain n segmentation blocks, and extending each of the n segmentation blocks to obtain a first feature block represented by a one-dimensional vector, to obtain the n first feature blocks.

18. The method according to claim 17, wherein sizes of the n segmentation blocks are the same.

19. An execution device, comprising a processor and a memory, wherein the processor is coupled to the memory;

the memory is configured to store a program; and the processor is configured to execute the program in the memory, so that the device performs the method according to claim 14.

* * * * *